US010390039B2

(12) United States Patent
Zhu et al.

(10) Patent No.: US 10,390,039 B2
(45) Date of Patent: Aug. 20, 2019

(54) MOTION ESTIMATION FOR SCREEN REMOTING SCENARIOS

(71) Applicant: Microsoft Technology Licensing, LLC, Redmond, WA (US)

(72) Inventors: Lihua Zhu, Mountain View, CA (US); B. Anil Kumar, Saratoga, CA (US); Olof L. E. Mases, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 15/253,568

(22) Filed: Aug. 31, 2016

(65) Prior Publication Data

US 2018/0063540 A1 Mar. 1, 2018

(51) Int. Cl.
*H04N 7/12* (2006.01)
*H04N 19/54* (2014.01)

(52) U.S. Cl.
CPC .................................... *H04N 19/54* (2014.11)

(58) Field of Classification Search
CPC ...... H04N 19/43; H04N 19/105; H04N 19/15; H04N 19/176; H04N 19/172
USPC ..................................................... 375/240.16
See application file for complete search history.

(56) References Cited

U.S. PATENT DOCUMENTS

| | | | |
|---|---|---|---|
| 2,239,538 | A | 4/1941 | Richter |
| 2,718,173 | A | 9/1955 | Hacman et al. |
| 3,059,528 | A | 10/1962 | Allan |
| 3,142,236 | A | 7/1964 | Siegmund et al. |
| 3,642,351 | A | 2/1972 | Tronnier et al. |
| 4,918,583 | A | 4/1990 | Kudo et al. |
| 5,016,980 | A | 5/1991 | Waldron |
| 5,610,841 | A | 3/1997 | Tanaka et al. |
| 5,613,004 | A | 3/1997 | Cooperman et al. |

(Continued)

FOREIGN PATENT DOCUMENTS

| | | |
|---|---|---|
| CN | 1857001 | 11/2006 |
| CN | 1874487 | 12/2006 |

(Continued)

OTHER PUBLICATIONS

Sangi et al., "Global Motion Estimation Using Block Matching with Uncertainty Analysis," *Signal Processing Conference*, pp. 1823-1827 (Sep. 2007).

(Continued)

*Primary Examiner* — Allen C Wong
(74) *Attorney, Agent, or Firm* — Klarquist Sparkman, LLP

(57) ABSTRACT

Innovations in motion estimation adapted for screen remoting scenarios are described herein. For example, as part of motion estimation for a current picture, a video encoder finds a pivot point in the current picture, calculates a hash value for the pivot point, and searches for a matching area in a previous picture. In doing so, the video encoder can calculate a hash index from the hash value and look up the hash index in a data structure to find candidate pivot points in the previous picture. The video encoder can compare the hash value for the pivot point in the current picture to a hash value for a candidate pivot point in the previous picture and, when the hash values match, compare sample values around the respective pivot points. In this way, the video encoder can quickly detect large areas of exact-match blocks having uniform motion.

40 Claims, 16 Drawing Sheets

(56) References Cited

U.S. PATENT DOCUMENTS 5,687,236 A 11/1997 Moskowitz et al.
5,689,365 A 11/1997 Takahashi
5,774,271 A 6/1998 Lagerway et al.
5,850,312 A 12/1998 Kato et al.
6,332,092 B1 12/2001 Deckert et al.
6,487,440 B2 11/2002 Deckert et al.
6,618,197 B1 9/2003 Hayakawa
6,879,266 B1 4/2005 Dye et al.
6,894,289 B2 5/2005 Nilson et al.
6,904,110 B2 6/2005 Trans et al.
6,915,387 B1 7/2005 Huffman et al.
6,938,128 B1 8/2005 Kuskin et al.
6,983,020 B2 1/2006 Christiansen
6,995,918 B2 2/2006 Terasawa et al.
7,046,460 B2 5/2006 Nozawa
7,206,346 B2 4/2007 Shimizu et al.
7,216,232 B1 5/2007 Cox et al.
7,239,454 B2 7/2007 Kobayashi et al.
7,349,583 B2 3/2008 Kumar et al.
7,379,499 B2 5/2008 Dahlhoff et al.
7,400,774 B2 7/2008 Puri et al.
7,421,128 B2 9/2008 Venkatesan et al.
7,430,670 B1 9/2008 Horning et al.
7,466,418 B2 12/2008 Nilson et al.
7,606,974 B2 10/2009 Dai et al.
7,609,763 B2 10/2009 Mukerjee et al.
7,613,364 B2 11/2009 Kang et al.
7,636,824 B1 12/2009 Tormusov
7,672,005 B1 3/2010 Hobbs et al.
7,702,127 B2 4/2010 Mihcak et al.
7,706,682 B2 4/2010 Keller et al.
7,733,497 B2 6/2010 Yun et al.
7,747,584 B1 6/2010 Jernigan, IV
7,761,712 B2 7/2010 Moskowitz et al.
7,868,792 B2 1/2011 Artan et al.
7,870,393 B2 1/2011 Moskowitz et al.
7,873,786 B1 1/2011 Singh et al.
7,912,244 B2 3/2011 Mihcak et al.
7,949,186 B2 5/2011 Grauman et al.
7,986,844 B2 7/2011 Diamant et al.
8,003,186 B2 8/2011 Ishizaki et al.
8,005,142 B2 8/2011 Kim et al.
8,041,677 B2 10/2011 Sumner et al.
8,086,052 B2 12/2011 Toth et al.
8,099,415 B2 1/2012 Luo et al.
8,099,601 B2 1/2012 Serret-Avila et al.
8,107,527 B1 1/2012 Hobbs et al.
8,126,282 B2 2/2012 Jung et al.
8,197,397 B2 6/2012 Rovegno
8,213,503 B2 7/2012 Tu et al.
8,264,489 B2 9/2012 Saint-Hilaire et al.
8,284,484 B2 10/2012 Hoult et al.
8,295,617 B2 10/2012 Collins
8,320,683 B2 11/2012 Konishi
8,335,255 B2 12/2012 Lee et al.
8,411,750 B2 4/2013 Dane
8,417,039 B2 4/2013 Albu et al.
8,442,942 B2 5/2013 Leppard
8,515,123 B2 8/2013 Thorwirth
8,619,857 B2 12/2013 Zhao et al.
8,644,620 B1 2/2014 Lam
8,681,870 B2 3/2014 Takada
8,787,460 B1 7/2014 Hobbs
8,897,512 B1 11/2014 Bozinovic et al.
9,167,020 B2 10/2015 Abdo et al.
9,223,534 B1 12/2015 Eilam
9,225,979 B1 12/2015 Jia et al.
9,235,313 B2 1/2016 Wu et al.
9,277,237 B2 3/2016 Abiezzi et al.
9,286,862 B2 3/2016 Peacock
9,332,270 B2 5/2016 Ju
2001/0001614 A1 5/2001 Boice et al.
2002/0118755 A1 8/2002 Karczewicz et al.
2003/0179951 A1 9/2003 Christiansen
2004/0131014 A1 7/2004 Thompson et al.
2004/0133548 A1 7/2004 Fielding et al.
2004/0174570 A1 9/2004 Plunkett et al.
2004/0223549 A1 11/2004 Karczewicz et al.
2005/0166040 A1 7/2005 Walmsley
2006/0062303 A1 3/2006 Xu
2006/0132931 A1 6/2006 Epple et al.
2006/0153295 A1 7/2006 Wang et al.
2006/0224594 A1 10/2006 Goyal et al.
2007/0025442 A1 2/2007 Okada et al.
2007/0036226 A1 2/2007 Kim et al.
2007/0041066 A1 2/2007 Yasuda et al.
2007/0053662 A1 3/2007 Tobita et al.
2007/0116110 A1 5/2007 Diamant et al.
2007/0199011 A1 8/2007 Zhang et al.
2008/0104652 A1 5/2008 Swenson et al.
2008/0212687 A1 9/2008 Liu
2009/0022374 A1 1/2009 Boult
2009/0115909 A1* 5/2009 Walls .................... H04N 5/145
348/699
2009/0129466 A1 5/2009 Cho et al.
2009/0244299 A1 10/2009 Fukunishi
2010/0057750 A1 3/2010 Aasted et al.
2010/0119170 A1 5/2010 Sengamedu et al.
2010/0166073 A1 7/2010 Schmit et al.
2010/0177893 A1* 7/2010 Jeon ...................... H04N 19/51
380/239
2010/0268836 A1 10/2010 Jabri et al.
2010/0284460 A1 11/2010 Tsai et al.
2010/0284471 A1 11/2010 Tsai et al.
2010/0293248 A1 11/2010 Kamay et al.
2011/0007801 A1 1/2011 Andersson et al.
2011/0010396 A1 1/2011 Zhou
2011/0044551 A1 2/2011 Lee et al.
2011/0051809 A1 3/2011 Lee
2011/0128810 A1 6/2011 Sato
2011/0225114 A1 9/2011 Gotthardt
2011/0243234 A1 10/2011 Kondo et al.
2011/0293013 A1 12/2011 Ma et al.
2011/0299785 A1 12/2011 Albu et al.
2011/0311042 A1 12/2011 Cheddad et al.
2012/0057631 A1 3/2012 Le Leannec
2012/0170653 A1 7/2012 Panusopone et al.
2012/0245688 A1 9/2012 Vanaclocha
2012/0294523 A1 11/2012 Abdo et al.
2013/0013618 A1 1/2013 Heller et al.
2013/0022113 A1 1/2013 Chen et al.
2013/0034158 A1 2/2013 Kirchhoffer et al.
2013/0034159 A1 2/2013 Siekmann et al.
2013/0036289 A1 2/2013 Welnicki et al.
2013/0057646 A1 3/2013 Chen et al.
2013/0057666 A1 3/2013 Fujii
2013/0067344 A1 3/2013 Ungureanu et al.
2013/0078592 A1 3/2013 McCarthy
2013/0084018 A1 4/2013 Nystad
2013/0114704 A1 5/2013 Chen et al.
2013/0142447 A1 6/2013 Park et al.
2013/0147974 A1 6/2013 Ju et al.
2013/0148721 A1 6/2013 Chen et al.
2013/0176560 A1 7/2013 Wax et al.
2013/0208810 A1 8/2013 Shen et al.
2013/0243089 A1 9/2013 Lim et al.
2013/0258052 A1 10/2013 Li et al.
2013/0266073 A1 10/2013 MacInnis et al.
2013/0266078 A1 10/2013 Deligiannis et al.
2013/0268621 A1 10/2013 Mese et al.
2013/0271565 A1 10/2013 Chen et al.
2013/0272394 A1 10/2013 Brockmann et al.
2013/0279564 A1 10/2013 Wang
2013/0279577 A1 10/2013 Schwarz et al.
2013/0335527 A1 12/2013 Takahashi et al.
2014/0002603 A1 1/2014 Takahashi et al.
2014/0003506 A1 1/2014 Wang et al.
2014/0010294 A1 1/2014 Ye et al.
2014/0016698 A1 1/2014 Joshi et al.
2014/0029668 A1 1/2014 Lim et al.
2014/0050413 A1 2/2014 Sato
2014/0064360 A1 3/2014 Rapaka et al.
2014/0092994 A1 4/2014 Wang
2014/0321553 A1 10/2014 Clark

(56) References Cited

U.S. PATENT DOCUMENTS

| | | | | |
|---|---|---|---|---|
| 2014/0369413 | A1 | 12/2014 | Clark | |
| 2014/0369421 | A1 | 12/2014 | Zhu et al. | |
| 2015/0054946 | A1 | 2/2015 | Zhang | |
| 2015/0063451 | A1 | 3/2015 | Zhu et al. | |
| 2015/0092840 | A1* | 4/2015 | Mochizuki | H04N 19/593 375/240.03 |
| 2016/0234530 | A1 | 8/2016 | Xu et al. | |
| 2016/0241876 | A1 | 8/2016 | Xu et al. | |
| 2016/0269732 | A1 | 9/2016 | Li et al. | |
| 2016/0277733 | A1 | 9/2016 | Li et al. | |
| 2016/0277761 | A1 | 9/2016 | Li et al. | |
| 2017/0163999 | A1 | 6/2017 | Li et al. | |
| 2017/0302936 | A1 | 10/2017 | Li et al. | |
| 2018/0063540 | A1 | 3/2018 | Zhu et al. | |
| 2018/0152699 | A1 | 5/2018 | Kumar et al. | |

FOREIGN PATENT DOCUMENTS

| | | |
|---|---|---|
| CN | 1874519 | 12/2006 |
| CN | 101283578 | 10/2008 |
| CN | 101710324 | 5/2010 |
| CN | 101866366 | 10/2010 |
| CN | 102576411 | 7/2012 |
| CN | 103281538 | 9/2013 |
| CN | 103430549 | 12/2013 |
| CN | 103841426 | 6/2014 |
| CN | 104574440 | 4/2015 |
| EP | 1349395 | 10/2003 |
| EP | 2996360 | 3/2016 |
| GB | 2375673 | 11/2002 |
| GB | 2460844 | 12/2009 |
| JP | H11-66301 | 3/1999 |
| JP | 2005-522083 | 7/2005 |
| JP | 2010-508734 | 3/2010 |
| JP | 2013-058873 | 3/2013 |
| RU | 2298226 | 4/2007 |
| WO | WO 00/60874 | 10/2000 |
| WO | WO 02/093934 | 11/2002 |
| WO | WO 2010/085899 | 8/2010 |
| WO | WO 2010/086548 | 8/2010 |
| WO | WO 2011/103206 | 8/2011 |
| WO | WO 2011/153005 | 12/2011 |
| WO | WO 2013/068433 | 5/2013 |
| WO | WO 2013/072484 | 5/2013 |
| WO | WO 2013/103376 | 7/2013 |
| WO | WO 2013/159038 | 10/2013 |
| WO | WO 2015/131325 | 9/2015 |
| WO | WO 2015/139165 | 9/2015 |
| WO | WO 2016/018422 | 2/2016 |

OTHER PUBLICATIONS

Ascenso et al., "Adaptive Hash-Based Side Information Exploitation for Efficient Wyner-Ziv Video Coding," *IEEE Int'l Conf. on Image Processing*, 4 pp. (Sep. 2007).

Bankoski et al., "VP8 Data Format and Decoding Guide," RFC 6386, 304 pp. (Nov. 2011).

Flynn et al., "High Efficiency Video Coding (HEVC) Range Extensions text specification: Draft 4," JCTVC-N1005, 322 pp. (Apr. 2013).

Flynn et al., "High Efficiency Video Coding (HEVC) Range Extensions text specification: Draft 6," JCTVC-P1005_v1, 355 pp. (Jan. 2014).

Gaikar, "Techinline Remote Desktop Software: Access Your Computers Remotely," *Tricks Machine*, 6 pp. (Jan. 2012).

ISO/IEC 11172-2, "Information technology—Coding of moving pictures and associated audio for digital storage media at up to about 1,5 Mbit/s—Part 2: Video," 122 pp. (Aug. 1993).

ISO/IEC 14496-2, "Information Technology—Coding of Audio-Visual Objects: Visual," ISO/IEC JTC1/SC29/WG11 N2202, 327 pp. (Mar. 1998).

ITU-T Recommendation H.261, "Video Codec for Audiovisual Services at px64 kbits," 29 pp. (Mar. 1993).

ITU-T Recommendation H.262, "Generic Coding of Moving Pictures and Associated Audio Information: Video," 218 pp. (Jul. 1995).

ITU-T Recommendation H.263, "Video coding for low bit rate communication," 167 pp. (Feb. 1998).

ITU-T Recommendation H.264, "Advanced video coding for generic audiovisual services," 680 pp. (Jan. 2012).

ITU-T Recommendation H.265, "High efficiency video coding," 317 pp. (Apr. 2013).

Kwon et al., "AHG5: Fast encoding using early skipping of Intra block copy (IntraBC) search," JCTVC-O0245, 9 pp. (Oct. 2013).

Li et al., "Description of screen content coding technology proposal by Microsoft," JCTVC-Q0035, 27 pp. (Mar. 2014).

Li et al., "Hash-based intraBC search," JCTVC-Q0252, 2 pp. (Mar. 2014).

Li et al., "Hash-based motion search," JCTVC-Q0245, 5 pp. (Mar. 2014).

Li et al., "Low complexity encoders for JCTVC-Q0035," JCTVC-Q0052, 4 pp. (Mar. 2014).

Praveen et al., "Analysis and Approximation of SAO Estimation for CTU-Level HEVC Encoder," *Proc. of Visual Communications and Image Processing*, 5 pp. (Nov. 2013).

Rane, "Hash-Aided Motion Estimation and Rate Control for Distributed Video Coding," EE392J Project Report, 10 pp. (Dec. 2004).

Robert et al., "Improving Intra mode coding in H.264/AVC through block oriented transforms," *IEEE 8th Workshop on Multimedia Signal Processing*, 5 pp. (Oct. 2006).

Shah et al., "HD Resolution Intra Prediction Architecture for H.264 Decoder," *IEEE Int'l Conf. on VLSI Design*, pp. 107-112 (Jan. 2012).

SMPTE Standard, "VC-1 Compressed Video Bitstream Format and Decoding Process," SMPTE 421M-2006, 493 pp. (Feb. 2006).

Sun et al., "Motion-Embedded Residual Error for Packet Loss Recovery of Video Transmission and Encryption," *Visual Communications and Image Processing*, vol. 6077, 14 pp. (Jan. 2006).

Wu et al., "Linear Hashtable Method Predicted Hexagonal Search Algorithm with Spatial Related Criterion," *Lecture Notes in Computer Science*, pp. 1208-1217 (Jun. 2005).

Yang et al., "MyFinder: Near-Duplicate Detection for Large Image Collections," *ACM Int'l Conf. on Multimedia*, pp. 1013-1014 (Oct. 2009).

Zhu et al., "2-D Dictionary Based Video Coding for Screen Contents," *Data Compression Conf.*, pp. 43-52 (Mar. 2014).

Zhu et al., "Screen content coding using 2-D dictionary mode," JCTVC-O0355, 4 pp. (Oct. 2013).

Zhu et al., "Screen content coding using 2-D dictionary mode," JCTVC-O0357, 4 pp. (Oct. 2013).

Brasnett et al., "Comments & Results on MPEG-7 Image Signature," MPEG2008/M15863, 4 pp. (Oct. 2008).

Chen et al., "Description of Screen Content Coding Technology Proposal by Qualcomm," JCTVC-Q0031, 18 pp. (Mar. 2014).

Chum et al., "Scalable Near Identical Image and Shot Detection," *Proceedings of International Conference on Image and Video Retrieval*, Jul. 9, 2007, pp. 549-556.

Gargi et al., "Performance Characterization of Video-Shot-Change Detection Methods," *IEEE Transactions on Circuits and Systems for Video Technology*, vol. 10, Issue 1, Feb. 1, 2000, 13 Pages.

Li et al., "A Unified Framework of Hash-based Matching for Screen Content Coding," *IEEE VCIP*, pp. 530-533 (Dec. 2014).

Li et al., "Adaptive Motion Vector Resolution for Screen Content," JCTVC-R0106 rl, ITU-T SG16 WP 3 and ISO/IEC JTC1/SC29/WG11, 18th Meeting, 16 pp. (Jun. 2014).

Li et al., "An HEVC-Based Screen Content Coding Scheme," JCTVC ITU-T SG16 WP3 and ISO/IEC JTC1/SC29/WG11 17th Meeting, 13 pp. (Mar. 27, 2014).

Li et al., "Screen Content Coding Using Dictionary Based Mode," JCTVC-P0214_r1, 5 pp. (Jan. 2014).

Monga et al, "Perceptual Image Hashing Via Feature Points: Performance Evaluation and Tradeoffs," *IEEE Transactions Image Processing*, pp. 3452-3465 (Nov. 2006).

(56) References Cited

OTHER PUBLICATIONS

Pauleve et al., "Locality Sensitive Hashing: A Comparison of Hash Function Types and Querying Mechanisms," *Pattern Recognition Letters*, vol. 31, No. 11, pp. 1348-1358 (Aug. 2010).
Rapaka et al., "Improved Intra Block Copy and Motion Search Methods for Screen Content Coding," *Visual Communications and Image Procsesing*, vol. 9599, pp. (Sep. 2015).
Ribas-Corbera et al., "Optimizing Motion-Vector Accuracy in Block-Based Video Coding," *IEEE Trans. on Circuits and Systems for Video Technology*, vol. 11, No. 4, pp. 497-511 (Apr. 2001).
Tagliasacchi et al., "Hash-Based Motion Modeling in Wyner-Ziv Video Coding," *IEEE Int'l Conf. on Acoustics, Speech, and Signal Processing*, 4 pp. (Apr. 2007).
Wei et al., "An Efficient Intra-Mode Selection Algorithm for H.264 Based on Edge Classification and Rate-Distortion Estimation," *Signal Processing: Image Communication*, vol. 23, No. 9, pp. 699-710, Oct. 1, 2008 (retrieved Aug. 22, 2008).
Wikipedia, "Locality-sensitive Hashing" 6 pp. (document marked: "last modified on Apr. 18, 2013").
Wikipedia, "Locality-sensitive Hashing" 7 pp. (document marked: "last edited on Feb. 6, 2018").
Yu et al., "New Intra Prediction using Intra-Macroblock Motion Compensation," JVT-C151, 10 pp. (May 2002).
Zhou et al., "Motion Vector Resolution Control for Screen Content Coding," JCTVC-P0277, 6 pp. (Jan. 2014).
Communication pursuant to Article 94(3) EPC dated Aug. 25, 2016, from European Patent Application No. 13895864.0, 7 pp.
Communication pursuant to Article 94(3) EPC dated Feb. 8, 2017, from European Patent Application No. 14884278.4, 5 pp.
Communication pursuant to Article 94(3) dated Jul. 6, 2017, from European Patent Application No. 14895767.3, 8 pp.
Communication pursuant to Article 94(3) dated Jun. 14, 2017, from European Patent Application No. 14885049.8, 7 pp.
Communication pursuant to Article 94(3) EPC dated Apr. 5, 2017, from European Patent Application No. 13895864.0, 4, pp.
Communication pursuant to Article 94(3) EPC dated Jan. 10, 2018, from European Patent Application No. 13895864.0, 4 pp.
Communication pursuant to Article 94(3) EPC dated Mar. 15, 2018, from European Patent Application No. 14895767.3, 5 pp.
Communication pursuant to Article 94(3) EPC dated Apr. 4, 2018, from European Patent Application No. 13896175.0, 6 pp.
Communication pursuant to Article 94(3) EPC dated May 24, 2018, from European Patent Application No. 13895864.0, 5 pp.
Communication pursuant to Rule 164(1) EPC dated Feb. 16, 2017, from European Patent Application No. 14885049.8, 7 pp.
Communication pursuant to Article 94(3) EPC dated Feb. 16, 2018, from European Patent Application No. 14903205.4, 11 pp.
Examination Report dated Sep. 29, 2016, from European Patent Application No. 13896175.0, 8 pp.
Final Office Action dated Apr. 6, 2018, from U.S. Appl. No. 15/024,812, 123 pp.
International Preliminary Report on Patentability dated May 6, 2016, from International Patent Application No. PCT/CN2013/085939, 6 pp.
International Preliminary Report on Patentability dated May 6, 2016, from International Patent Application No. PCT/CN2013/085937, 7 pp.
International Preliminary Report on Patentability dated Sep. 15, 2016, from International Patent Application No. PCT/CN2014/072834, 6 pp.
International Preliminary Report on Patentability dated Sep. 15, 2016, from International Patent Application No. PCT/CN2014/072827, 6 pp.
International Preliminary Report on Patentability dated Jan. 5, 2017, from International Patent Application No. PCT/CN2014/080481, 7 pp.
International Search Report and Written Opinion dated Jun. 10, 2014, from International Patent Application No. PCT/CN2013/085937, 12 pp.
International Search Report and Written Opinion dated Jul. 30, 2014, from International Patent Application No. PCT/CN2013/085939, 12 pp.
International Search Report and Written Opinion dated Dec. 10, 2014, from International Patent Application No. PCT/CN2014/072827, 12 pp.
International Search Report and Written Opinion dated Dec. 3, 2014, from International Patent Application No. PCT/CN2014/072834, 13 pp.
International Search Report and Written Opinion dated Mar. 2, 2015, from International Patent Application No. PCT/CN2014/080481, 13 pp.
International Search Report and Written Opinion dated Jul. 1, 2015, from International Patent Application No. PCT/CN2014/087869, 12 pp.
International Search Report and Written Opinion dated May 3, 2018, from International Patent Application No. PCT/US2017/063164, 30 pp.
International Search Report and Written Opinion dated Jan. 24, 2018, from International Patent Application No. PCT/US2017/057066, 12 pp.
Invitation pursuant to Article 94(3) and Rule 71(1) EPC dated May 31, 2017, from European Patent Application No. 14884278.4, 3 pp.
Invitation pursuant to Article 94(3) and Rule 71(1) EPC dated Oct. 26, 2017, from European Patent Application No. 14885049.8, 5 pp.
Li et al., "RDPCM operation unification and cleanup," JCTVC-O0185, pp. 1-6 (Oct. 2013).
Notice on Grant of Patent dated Jun. 5, 2018, from Chinese Patent Application No. 201380080482.X, 4 pp.
Notice on the First Office Action dated Jun. 2, 2017, from Chinese Patent Application No. 201380080482.X, 13 pp.
Notice on the First Office Action dated Jan. 17, 2018, from Chinese Patent Application No. 201480030627.X, 14 pp.
Notice on the First Office Action dated Feb. 5, 2018, from Chinese Patent Application No. 201480029780.0, 14 pp.
Notice on the First Office Action dated Mar. 20, 2018, from Chinese Patent Application No. 201380080483.4, 12 pp.
Notice on the First Office Action dated May 3, 2018, from Chinese Patent Application No. 201480048046.9, 12 pp.
Notice on the Second Office Action dated Jan. 4, 2018, from Chinese Patent Application No. 201380080482.X, 7 pp.
Riguer et al., "Real-Time Depth of Field Simulation," *ShaderX2: Shader Programming Tips and Tricks with DirectX 9*, pp. 1-30 (Jan. 2003).
Supplementary European Search Report dated Jul. 5, 2016, from European Patent Application No. 13895864.0, 4 pp.
Supplementary European Search Report dated Sep. 14, 2016, from European Patent Application No. 13896175.0, 6 pp.
Supplementary European Search Report dated Jan. 31, 2017, from European Patent Application No. 14884278.4, 4 pp.
Supplementary European Search Report dated May 18, 2017, from European Patent Application No. 14885049.8, 6 pp.
Supplementary European Search Report dated Jun. 14, 2017, from European Patent Application No. 14895767.3, 5 pp.
Supplementary Partial European Search Report dated Sep. 27, 2017, from European Patent Application No. 14903205.4, 14 pp.
Supplementary European Search Report dated Jan. 29, 2018, from European Patent Application No. 14903205.4, 9 pp.
Extended European Search Report dated Aug. 21, 2018, from European Patent Application No. 18176302.0, 5 pp.
Final Office Action dated Apr. 9, 2018, from U.S. Appl. No. 15/321,536, 58 pp.
Final Office Action dated Nov. 21, 2018, from U.S. Appl. No. 15/029,589, 50 pp.
First Office Action and Search Report dated Jul. 19, 2018, from Chinese Patent Application No. 201480071892.2, 10 pp.
International Preliminary Report on Patentability dated Apr. 13, 2017, from International Patent Application No. PCT/CN2014/087869, 6 pp.
Li et al., "Improvement for hash based inter search," JCTVC-S0089, 4 pp. (Oct. 2014).

(56) References Cited

OTHER PUBLICATIONS

Liu et al., "Motion Feature and Hadamard Coefficient-Based Fast Multiple Reference Frame Motion Estimation for H.264," *IEEE Trans. On Circuits and Systems for Video Technology,* vol. 18, No. 5, pp. 620-632 (May 2008).
Notice on the Second Office Action dated Sep. 29, 2018, from Chinese Patent Application No. 201480030627.X, 13 pp.
Notice on the Second Office Action dated Oct. 29, 2018, from Chinese Patent Application No. 201480029780.0, 11 pp.
Notice on Second Office Action dated Nov. 29, 2018, from Chinese Patent Application No. 201380080483.4, 6 pp.
Office Action dated May 1, 2018, from U.S. Appl. No. 15/253,568, 7 pp.
Office Action dated Jul. 31, 2018, from U.S. Appl. No. 15/029,589, 45 pp.
Office Action dated Aug. 27, 2018, from U.S. Appl. No. 15/365,927, 22 pp.
Office action dated Jul. 12, 2018, from Russian Patent Application No. 2017110461, 7 pp.
Office action dated Jun. 26, 2018, from Japanese Patent Application No. 2017-517045, 7 pp.
Office Action dated Oct. 4, 2017, from U.S. Appl. No. 15/024,812, 75 pp.
Office Action dated Oct. 1, 2018, from U.S. Appl. No. 15/024,816, 59 pp.
Office Action dated Oct. 9, 2018, from U.S. Appl. No. 15/321,536, 65 pp.
Office Action dated Oct. 19, 2018, from U.S. Appl. No. 15/029,585, 49 pp.
Office Action dated Nov. 6, 2017, from U.S. Appl. No. 15/029,585, 51 pp.
Search Report dated Sep. 27, 2018, from European Patent Application No. 18176304.6, 8 pp.
Communication under Rule 71(3) EPC dated Feb. 22, 2019, from European Patent Application No. 14895767.3, 5 pp.
Notice on the Second Office Action dated Jan. 23, 2019, from Chinese Patent Application No. 201480048046.9, 6 pp.
Notice on the Third Office Action dated Mar. 13, 2019, from Chinese Patent Application No. 201480030627.X, 6 pp.
Office Action dated Sep. 28, 2017, from U.S. Appl. No. 15/024,816, 45 pp.
Office Action dated Oct. 2, 2017, from U.S. Appl. No. 15/024,816, 44 pp.
Office Action dated Oct. 13, 2017, from U.S. Appl. No. 15/321,536, 52 pp.
Office Action dated Mar. 12, 2019, from U.S. Appl. No. 15/029,589, 79 pp.

* cited by examiner

400

550

700

- store locations and hash values for pivot points in a previous picture (710) of screen capture video

- find pivot points in the current picture (720) of screen capture video

- for a pivot point (shaded) in the current picture (720), find a pivot point with the same hash value in the previous picture (710)

- find a matching area (712) that includes the matching pivot points example pattern 1210
for pivot point example pattern 1220
for pivot point example pattern 1230
for pivot point key picture (1310):
find pivot points in entire picture non-key picture (1320):
find pivot points in changed region(s), which are shown shaded 1500
(example of 1454)

MOTION ESTIMATION FOR SCREEN REMOTING SCENARIOS

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

Digital video can consume an extremely high amount of bits. The number of bits that is used per second of represented video content is known as the bit rate. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10), and H.265 (ISO/IEC 23008-2) standards, the MPEG-1 (ISO/IEC 11172-2) and MPEG-4 Visual (ISO/IEC 14496-2) standards, and the SMPTE 421M standard. A video codec standard typically defines options for the syntax of an encoded video bitstream, detailing parameters in the bitstream when particular features are used in encoding and decoding. In many cases, a video codec standard also provides details about the decoding operations a video decoder should perform to achieve conforming results in decoding. Aside from codec standards, various proprietary codec formats define options for the syntax of an encoded video bitstream and corresponding decoding operations.

In general, video compression techniques include "intra-picture" compression and "inter-picture" compression. Whereas intra-picture compression compresses a given picture u sing information within that picture, and inter-picture compression compresses a given picture with reference to a preceding and/or following picture (often called a reference or anchor picture) or pictures.

Inter-picture compression techniques often use motion estimation and motion compensation to reduce bit rate by exploiting temporal redundancy in a video sequence. Motion estimation is a process for estimating motion between pictures. In one common technique, an encoder using motion estimation attempts to match a current block of sample values in a current picture with a candidate block of the same size in a search area in another picture, the reference picture. A reference picture is, in general, a picture that contains sample values that may be used for prediction in the encoding and decoding process of other pictures.

For a current block, when the video encoder finds an exact or "close enough" match in the search area in the reference picture, the video encoder parameterizes the change in position between the current and candidate blocks as motion data such as a motion vector ("MV"). An MV is conventionally a two-dimensional value, having a horizontal MV component that indicates left or right spatial displacement and a vertical MV component that indicates up or down spatial displacement. An MV can indicate a spatial displacement in terms of an integer number of samples starting from a co-located position in a reference picture for a current block. For example, for a current block at position (32, 16) in a current picture, the MV (−3, 1) indicates a block at position (29, 17) in the reference picture. In general, motion compensation is a process of reconstructing pictures from reference picture(s) using motion data.

When encoding a block using motion estimation and motion compensation, an encoder often computes the sample-by-sample differences (also called residual values or error values) between the sample values of the block and its motion-compensated prediction. The residual values may then be encoded. For the residual values, encoding efficiency depends on the complexity of the residual values and how much loss or distortion is introduced as part of the compression process. In general, a good motion-compensated prediction closely approximates a block, such that the residual values include few significant values, and the residual values can be efficiently encoded. On the other hand, a poor motion-compensated prediction often yields residual values that include many significant values, which are more difficult to encode efficiently.

Encoders typically spend a large proportion of encoding time performing motion estimation, attempting to find good matches and thereby improve rate-distortion performance. Encoder-side decisions about motion estimation are not made effectively, however, in certain encoding scenarios. In particular, motion estimation decisions are not made effectively in various situations when encoding screen capture content for remote screen presentation (also called "screen remoting"). For example, when screen capture video shows a user scrolling through a text document or dragging a window that includes text content around a graphical user interface, conventional block-based motion estimation for 16×16 blocks, 8×8 blocks, 4×4 blocks, etc. is typically complex and time-consuming. In addition to using a significant amount of processing resources, which is problematic for low-complexity devices, this can add delay, which is problematic for real-time screen remoting. Also, block-based motion estimation often fails to detect scrolling activity and window movement activity of large magnitude in screen capture video. When such scrolling activity and window movement activity are not efficiently encoded, overall compression efficiency suffers, which is especially problematic in low-bandwidth scenarios.

SUMMARY

In summary, the detailed description presents innovations in motion estimation that are adapted for screen remoting scenarios. Using the innovations, a video encoder can quickly perform motion estimation while still detecting scrolling or window movement activity that is common in screen capture video, even when the scrolling or window movement activity has large magnitude. Although particularly useful in screen remoting scenarios, the innovations can also be used in other video encoding scenarios.

According to various aspects of the innovations described herein, a video encoder receives pictures in a video sequence and encodes the pictures to produce encoded data. The encoding includes performing motion estimation for a current picture among the pictures in the sequence. The video encoder outputs the encoded data as part of a bitstream.

According to one aspect of the innovations described herein, as part of the motion estimation for the current picture, the video encoder finds a pivot point in the current picture. To find the pivot point in the current picture, the video encoder can compare sample values for the current picture to one or more patterns, where each of the pattern(s) is indicative of an edge or character. The video encoder calculates a hash value for the pivot point in the current picture. For example, to calculate the hash value, the video encoder uses a hashing function such as a Cantor pairing function or other hashing function.

The video encoder searches for a matching area in a previous picture based at least in part on the hash value for the pivot point in the current picture. For example, the video encoder calculates a hash index from the hash value for the pivot point in the current picture and looks up the hash index in a data structure to find a list of one or more candidate pivot points in the previous picture. Then, for each of at least one of the candidate pivot point(s), the video encoder compares the hash value for the pivot point in the current picture to a hash value for the candidate pivot point. When the hash value for the pivot point in the current picture matches the hash value for a given candidate pivot point among the candidate pivot point(s), the video encoder can compare multiple sample values in an area around the pivot point in the current picture with corresponding sample values around the given candidate pivot point in the previous picture. The video encoder can selectively enlarge the area, so long as sample values match. In this way, the video encoder can quickly detect large areas of scrolling activity, window movement activity or other uniform motion in screen capture video or other video.

The video encoder can use a data structure to track hash values for pivot points. For example, a data structure used in motion estimation for the current picture includes one or more lists. Each of the list(s) includes one or more candidate pivot points in the previous picture. Using the data structure, a hash value for a pivot point in the current picture can be compared to a hash value for a candidate pivot point. After motion estimation completes for the current picture, the video encoder can update the data structure by retaining at least one of the candidate pivot point(s) in the previous picture, removing at least one of the candidate pivot point(s) in the previous picture, and/or adding at least one pivot point in the current picture.

According to another aspect of the innovations described herein, a video encoder performs motion estimation using derivative sample values rather than base sample values. The video encoder calculates multiple derivative sample values for a current picture based on base sample values for the current picture. For example, a given derivative sample value, among the multiple derivative sample values, is calculated by combining multiple bits of a base luma sample value with at least one bit of a first base chroma sample value and at least one bit of a second base chroma sample value. When used in combination with hashing of sample values for a pivot point, the derivative sample values can be used to find a pivot point in the current picture and to calculate the hash value for the pivot point in the current picture. Using derivative sample values can speed up motion estimation while still detecting motion effectively for typical screen capture video or other "artificial" video content.

According to another aspect of the innovations described herein, a video encoder performs motion estimation only for changed regions of a current picture. For example, the video encoder identifies one or more changed regions in the current picture relative to the previous picture. When used in combination with hashing of sample values for a pivot point, the video encoder can find a pivot point in the current picture by evaluating sample values for the changed region(s) in the current picture. When a data structure is used to track hash values for pivot points, the video encoder can consider which regions have changed when updating the data structure. For example, the video encoder retains any candidate pivot point in the previous picture that is outside the changed region(s), removes any candidate pivot point in the previous picture that is inside the changed region(s), and/or adds at least one pivot point in the current picture that is inside the changed region(s). By focusing motion estimation on changed regions, the video encoder can speed up the motion estimation process while still detecting most motion due to scrolling activity, window movement activity, or other activity.

According to another aspect of the innovations described herein, when performing motion estimation for a current picture, a video encoder aggregates local motion information for multiple smaller areas into global motion metadata for a larger area that includes the multiple smaller areas. The video encoder can then use the global motion metadata to skip block-based motion estimation operations for multiple partitions of the current picture. For example, the video encoder assigns motion vectors ("MVs") for the multiple partitions based on the global motion metadata. In addition to speeding up motion estimation, using global motion metadata can effectively detect and represent uniform motion in large areas for scrolling activity, window movement activity, or other activity.

Alternatively, the video encoder can signal the global motion metadata as part of the bitstream. In this case, when decoding pictures, a corresponding video decoder can parse syntax elements from the bitstream, determine the global motion metadata from the syntax elements, assign MVs for multiple partitions of the current picture based on the global motion metadata, and perform motion compensation for the multiple partitions of the current picture. Signaling global motion metadata in the bitstream potentially reduces bitrate by providing an effective representation of motion data.

The innovations can be implemented as part of a method, as part of a computing system configured to perform operations for the method, or as part of one or more computer-readable media storing computer-executable instructions for causing a computing system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

DETAILED DESCRIPTION

Figure 1:
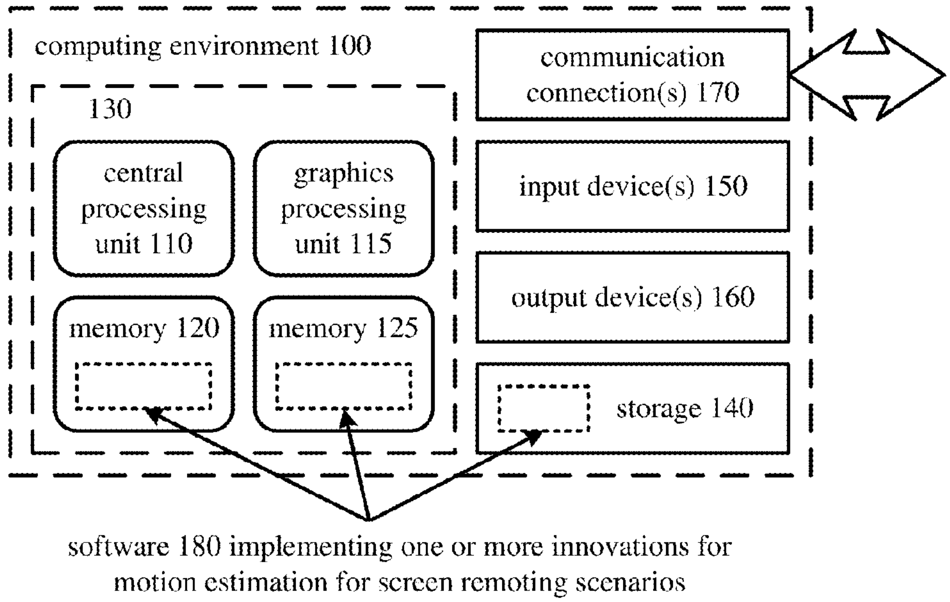
FIG. 1 is a diagram illustrating an example computing system in which some described embodiments can be implemented.

The detailed description presents innovations in motion estimation adapted for screen remoting scenarios. For example, as part of motion estimation for a current picture, a video encoder finds a pivot point in the current picture, calculates a hash value for the pivot point, and searches for a matching area in a previous picture. In doing so, the video encoder can calculate a hash index from the hash value and look up the hash index in a data structure to find candidate pivot points in the previous picture. The video encoder can compare the hash value for the pivot point in the current picture to a hash value for a candidate pivot point in the previous picture. When the hash values match, the video encoder can compare sample values around the pivot point in the current picture with corresponding sample values around the candidate pivot point in the previous picture. To further expedite motion estimation, the video encoder can use derivative sample values, focus on changed regions, and/or calculate global motion metadata. In this way, the video encoder can quickly detect large areas of uniform motion of exact-match blocks.

Some of the innovations described herein are illustrated with reference to screen remoting scenarios. Using innovations described herein, a video encoder can encode screen capture video with very low encoding latency. Such video is common for remote desktop presentation scenarios. More generally, the innovations described herein can be used when encoding other types of video (e.g., "natural" video captured with a camera).

Some of the innovations described herein are illustrated with reference to terms specific to the H.264 standard or H.265 standard, or extensions or variations thereof. The innovations described herein can also be implemented for other video codec standards or formats (e.g., the VP8 format or VP9 format), or extensions or variations thereof.

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. For example, when performing motion estimation with hashing of sample values for pivot points, a video encoder can use a multi-level data structure for hashing or use some other data structure, can use derivative sample values or base sample values, can perform motion estimation for only changed regions or for all regions, and/or can use or not use global motion metadata. Or, as another example, when using derivative sample values in motion estimation, a video encoder can perform the motion estimation with hashing of sample values for pivot points or perform some other type of motion estimation, can perform motion estimation for only changed regions or for all regions, and/or can use or not use global motion metadata. Or, as another example, when performing motion estimation for only changed regions, a video encoder can perform the motion estimation with hashing of sample values for pivot points or perform some other type of motion estimation, can use derivative sample values or base sample values, and/or can use or not use global motion metadata. Or, as another example, when performing motion estimation with global motion metadata, a video encoder can perform the motion estimation with hashing of sample values for pivot points or perform some other type of motion estimation, can use derivative sample values or base sample values, and/or can perform motion estimation for only changed regions or for all regions. Some of the innovations described herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a GPU (115). In general, the GPU (115) is any specialized circuit, different from the CPU (110), that accelerates creation and/or manipulation of image data in a graphics pipeline. The GPU (115) can be implemented as part of a dedicated graphics card (video card), as part of a motherboard, as part of a system on a chip ("SoC"), or in some other way (even on the same die as the CPU (110)).

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPU (110), and the memory (125) is GPU memory, accessible to the GPU (115). Depending on architecture (e.g., whether the GPU (115) is part of a video card, motherboard, or SoC), the CPU memory can be completely separate from the GPU memory, or the CPU memory and GPU memory can, at least in part, be shared memory or drawn from the same source (e.g., RAM). The memory (120, 125) stores software (180) implementing one or more innovations for motion estimation for screen remoting scenarios, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations for motion estimation for screen remoting scenarios.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine," "find," "receive," and "search" to describe computer operations in a computer system. These terms are high-level abstractions for operations performed by a computer, and should not be confused with acts performed by a human being. The actual computer operations corresponding to these terms vary depending on implementation.

II. Example Network Environments.

Figure 2A:
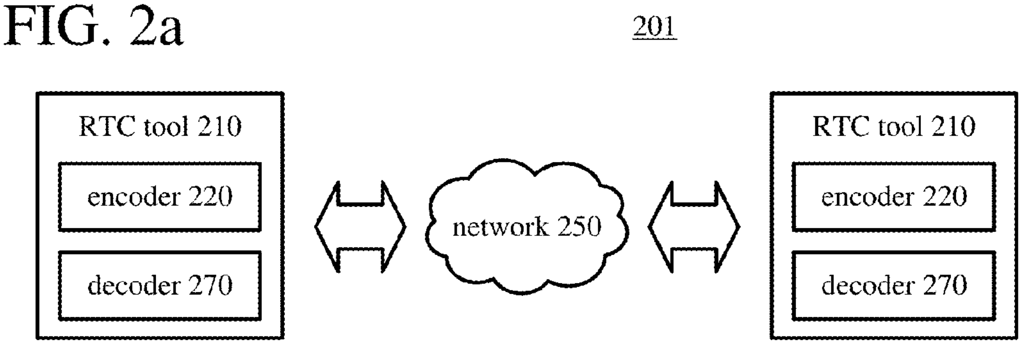
FIGS. 2*a* and 2*b* are diagrams illustrating example network environments in which some described embodiments can be implemented.
Figure 2B:
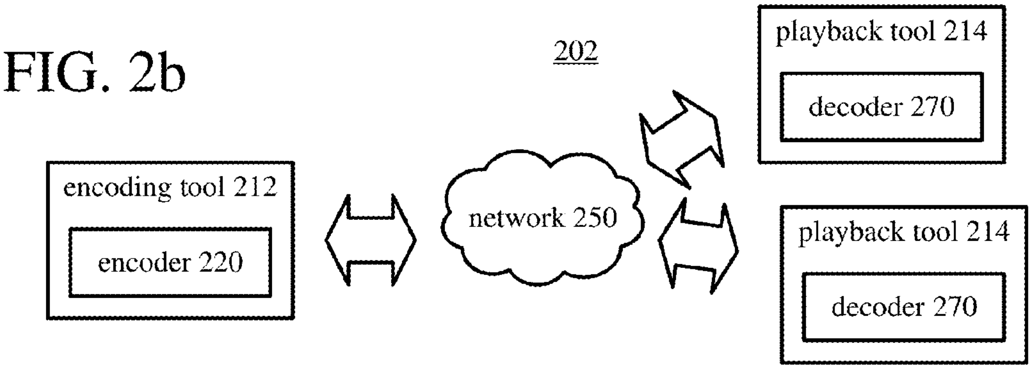

FIGS. 2*a* and 2*b* show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2*a*, each real-time communication ("RTC") tool (210) includes both an encoder (220) and a decoder (270) for bidirectional communication. A given encoder (220) can produce output compliant with the H.265/HEVC standard, SMPTE 421M standard, ISO/IEC 14496-10 standard (also known as H.264/AVC), another standard, or a proprietary format such as VP8 or VP9, or a variation or extension thereof, with a corresponding decoder (270) accepting encoded data from the encoder (220). The bidirectional communication can be part of a video conference, video telephone call, or other two-party or multi-party communication scenario. Although the network environment (201) in FIG. 2*a* includes two RTC tools (210), the network environment (201) can instead include three or more RTC tools (210) that participate in multi-party communication.

Figure 3:
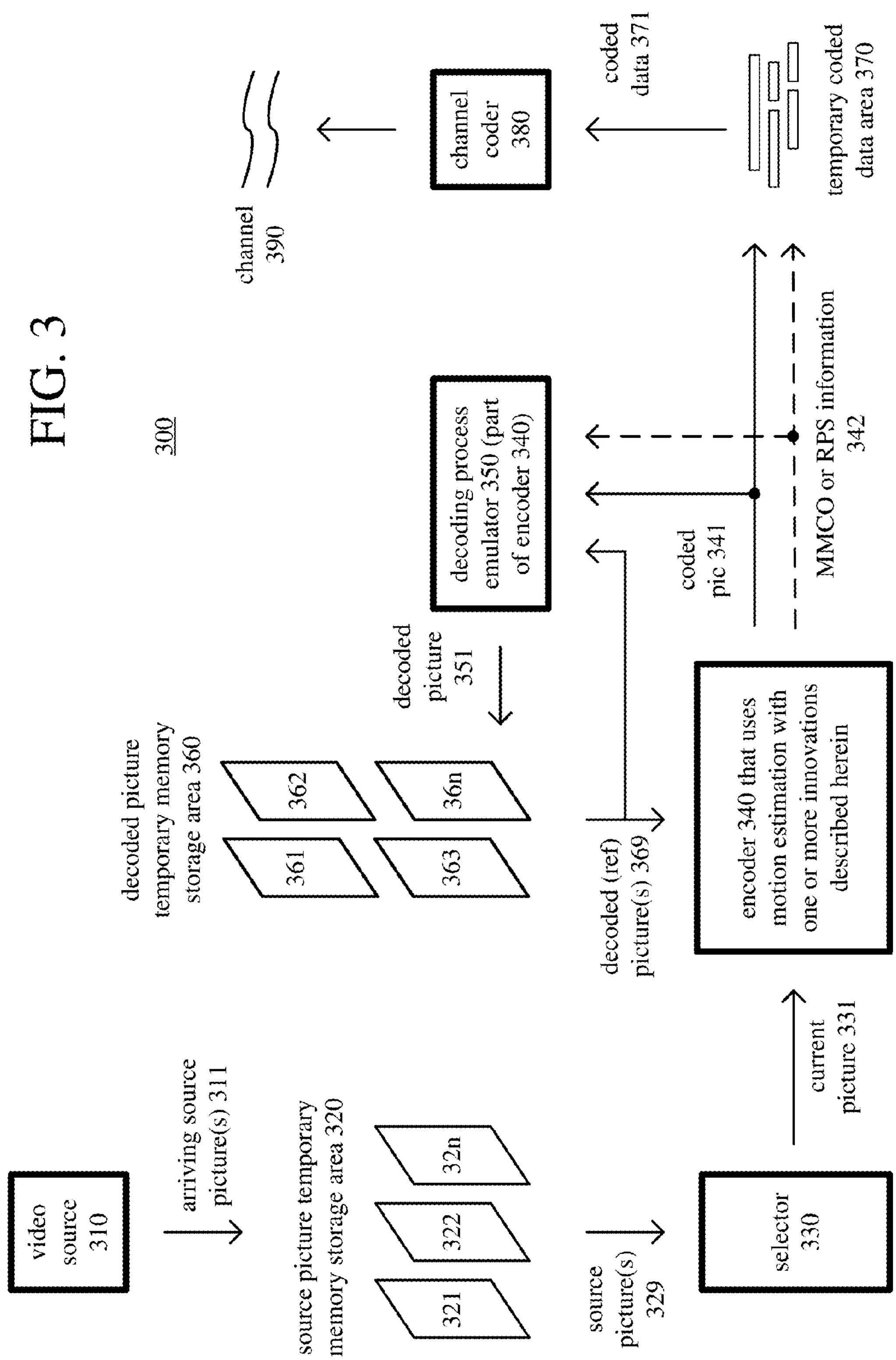
FIG. 3 is a diagram illustrating an example video encoder system.
Figure 5:
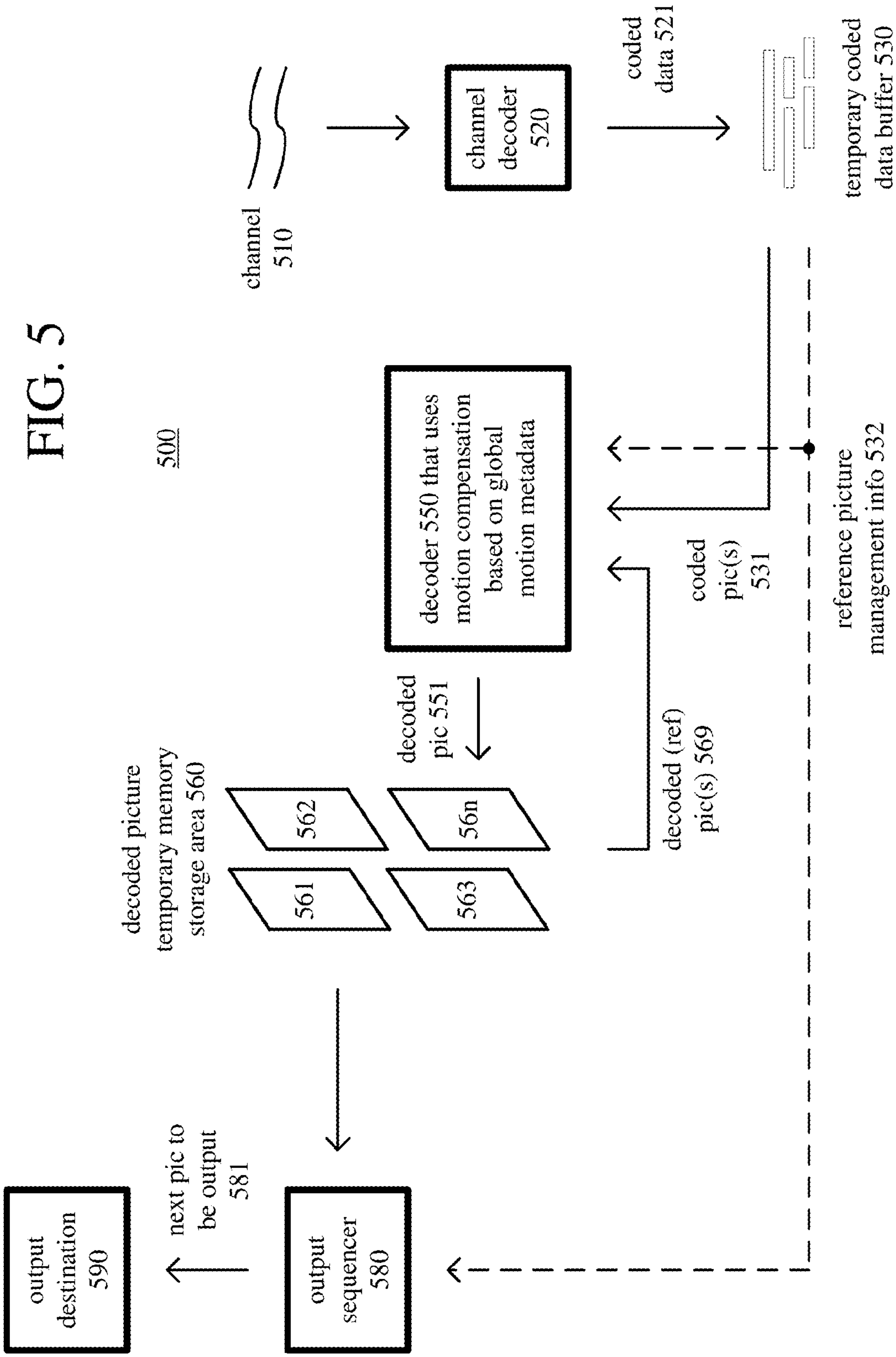
FIG. 5 is a diagram illustrating an example video decoder system.

An RTC tool (210) manages encoding by an encoder (220) and also manages decoding by a decoder (270). FIG. 3 shows an example video encoder system (300) that can be included in the RTC tool (210). Alternatively, the RTC tool (210) uses another encoder system. FIG. 5 shows an example video decoder system (500) that can be included in the RTC tool (210). Alternatively, the RTC tool (210) uses another decoder system.

In the network environment (202) shown in FIG. 2*b*, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or sharing, wireless screen casting, cloud computing or gaming, or other scenario in which video is encoded and sent from one location to one or more other locations. Although the network environment (202) in FIG. 2*b* includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

The encoding tool (212) can include server-side controller logic for managing connections with one or more playback tools (214). FIG. 3 shows an example video encoder system (300) that can be included in the encoding tool (214). Alternatively, the encoding tool (214) uses another encoder system. A playback tool (214) can include client-side controller logic for managing connections with the encoding tool (212). FIG. 5 shows an example video decoder system (500) that can be included in the playback tool (214). Alternatively, the playback tool (214) uses another decoder system.

III. Example Video Encoder Systems.

FIG. 3 shows an example video encoder system (300) in conjunction with which some described embodiments may be implemented. The video encoder system (300) includes a video encoder (340) the implements motion estimation with one or more of the innovations described herein. The video encoder (340) is further detailed in FIGS. 4*a* and 4*b*.

The video encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The video encoder system (300) can be adapted for encoding of a particular type of content (e.g., screen capture video). The video encoder system (300) can be implemented as part of an operating system module, as part of an application library, as part of a standalone application, or using special-purpose hardware. Overall, the video encoder system (300) receives a sequence of source video pictures (311) from a video source (310) and produces encoded data as output to a channel (390). The encoded data output to the channel can include content encoded using one or more of the innovations described herein.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32*n*). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320) to encode as the current picture (331). The order in which pictures are selected by the picture selector (330) for input to the video encoder (340) may differ from the order in which the pictures are produced by the video source (310), e.g., the encoding of some pictures may be delayed in order, so as to allow some later pictures to be encoded first and to thus facilitate temporally backward prediction. Before the video encoder (340), the video encoder system (300) can include a pre-processor (not shown) that performs pre-processing of the current picture (331) before encoding. The pre-processing can include color space conversion and resampling processing (e.g., to reduce the spatial resolution of chroma components) for encoding.

In general, a pixel is the set of one or more collocated sample values for a location in a picture, which may be arranged in different ways for different chroma sampling formats. Typically, before encoding, the sample values of video are converted to a color space such as YUV, in which sample values of a luma (Y) component represent brightness or intensity values, and sample values of chroma (U, V) components represent color-difference values. The precise definitions of the color-difference values (and conversion operations between YUV color space and another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. Chroma sample values may be sub-sampled to a lower chroma sampling rate (e.g., for a YUV 4:2:0 format) in order to reduce the spatial resolution of chroma sample values, or the chroma sample values may have the same resolution as the luma sample values (e.g., for a YUV 4:4:4 format).

Figure 4A:
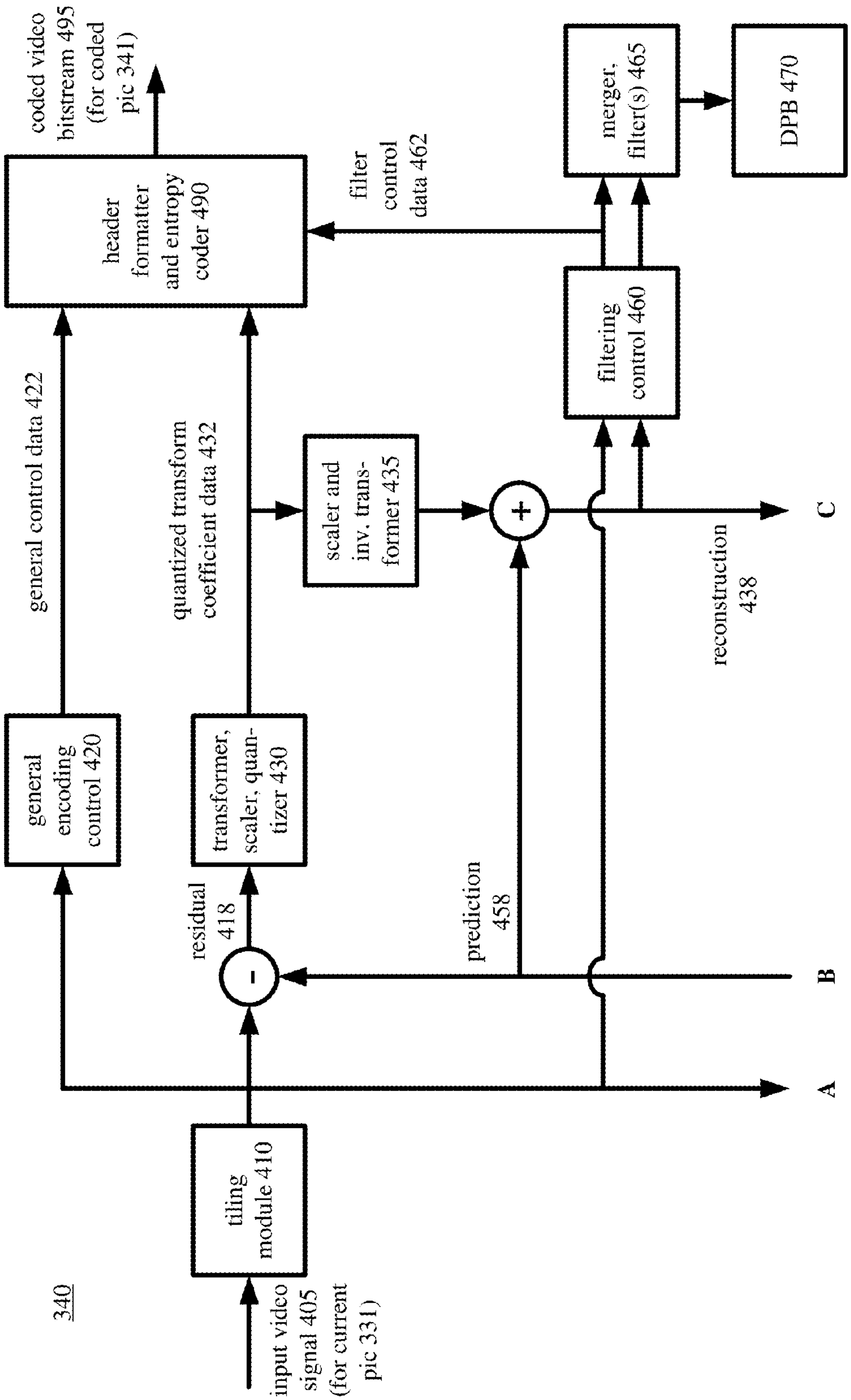
FIGS. 4*a* and 4*b* are diagrams illustrating an example video encoder, in conjunction with which some described embodiments can be implemented.
Figure 4B:
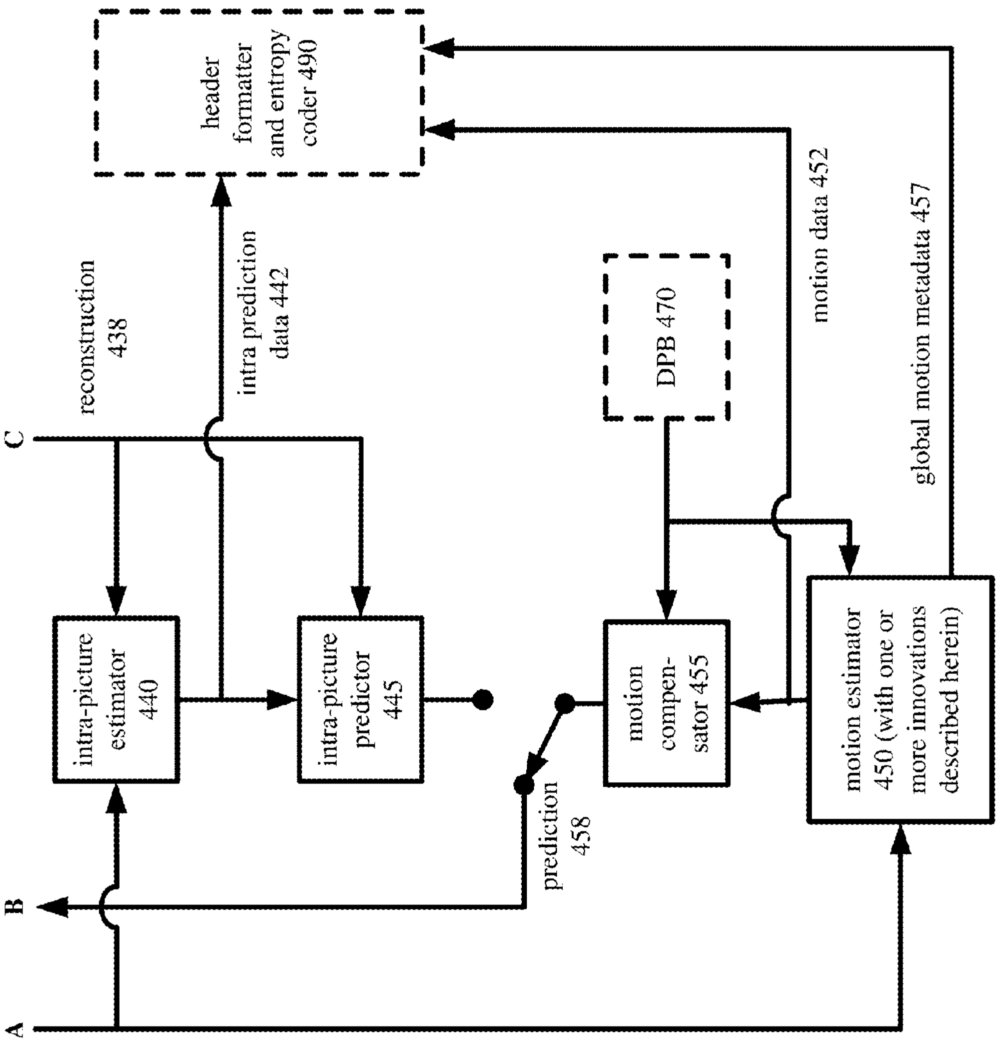

The video encoder (340) encodes the current picture (331) to produce a coded picture (341). As shown in FIGS. 4*a* and 4*b*, the video encoder (340) receives the current picture (331) as an input video signal (405) and produces encoded data for the coded picture (341) in a coded video bitstream (495) as output. As part of the encoding, the video encoder (340) in some cases uses one or more of the innovations for motion estimation as described herein.

Generally, the video encoder (340) includes multiple encoding modules that perform encoding tasks such as splitting into tiles, intra-picture prediction estimation and prediction, motion estimation and compensation, frequency transforms, quantization, and entropy coding. Many of the components of the video encoder (340) are used for both intra-picture coding and inter-picture coding. The exact operations performed by the video encoder (340) can vary depending on compression format and can also vary depending on encoder-optional implementation decisions.

As shown in FIG. 4*a*, the video encoder (340) can include a tiling module (410). With the tiling module (410), the video encoder (340) can split a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further split into blocks or other sets of sample values for purposes of encoding and decoding. Blocks may be further sub-divided at different stages, e.g., at the prediction, frequency transform and/or entropy encoding stages. For example, a picture can be divided into 64×64 blocks, 32×32 blocks, or 16×16 blocks, which can in turn be divided into smaller blocks of sample values for coding and decoding.

For syntax according to the H.264/AVC standard, the video encoder (340) can split a picture into one or more slices of the same size or different sizes. The video encoder (340) splits the content of a picture (or slice) into 16×16 macroblocks. A macroblock ("MB") includes luma sample values organized as four 8×8 luma blocks and corresponding chroma sample values organized as 8×8 chroma blocks. Generally, a MB has a prediction mode such as inter or intra. A MB includes one or more prediction units (e.g., 8×8 blocks, 4×4 blocks, which may be called partitions for inter-picture prediction) for purposes of signaling of prediction information (such as prediction mode details, MV information, etc.) and/or prediction processing. A MB also has one or more residual data units for purposes of residual coding/decoding.

For syntax according to the H.265/HEVC standard, the video encoder (340) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the video encoder. A luma CTB can contain, for example, 64×64, 32×32, or 16×16 luma sample values. A CTU includes one or more coding units. A coding unit ("CU") has a luma coding block ("CB") and two corresponding chroma CBs. For example, according to quadtree syntax, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs according to quadtree syntax. Or, as another example, according to quadtree syntax, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs according to quadtree syntax.

In H.265/HEVC implementations, a CU has a prediction mode such as inter or intra. A CU typically includes one or more prediction units for purposes of signaling of prediction information (such as prediction mode details, displacement values, etc.) and/or prediction processing. A prediction unit ("PU") has a luma prediction block ("PB") and two chroma PBs. For an inter-picture-predicted CU, the CU can have one, two, or four PUs, where splitting into four PUs is allowed only if the CU has the smallest allowable size.

In H.265/HEVC implementations, a CU also typically has one or more transform units for purposes of residual coding/decoding, where a transform unit ("TU") has a luma transform block ("TB") and two chroma TBs. A CU may contain a single TU (equal in size to the CU) or multiple TUs. According to quadtree syntax, a TU can be split into four smaller TUs, which may in turn be split into smaller TUs according to quadtree syntax. The video encoder decides how to split video into CTUs (CTBs), CUs (CBs), PUs (PBs) and TUs (TBs).

As used herein, the term "block" can indicate a MB, residual data unit, CTB, CB, PB or TB, or some other set of sample values, depending on context. The term "unit" can indicate a MB, CTU, CU, PU, TU or some other set of blocks, or it can indicate a single block, depending on context. The term "partition" can indicate a PU or other unit used in prediction operations, or PB or other block used in prediction operations, depending on context.

As shown in FIG. 4*a*, the video encoder (340) includes a general encoding control (420), which receives the input video signal (405) for the current picture (331) as well as feedback (not shown) from various modules of the video encoder (340). Overall, the general encoding control (420) provides control signals (not shown) to other modules, such as the tiling module (410), transformer/scaler/quantizer (430), scaler/inverse transformer (435), intra-picture prediction estimator (440), motion estimator (450), and intra/inter switch, to set and change coding parameters during encoding. The general encoding control (420) can evaluate intermediate results during encoding, typically considering bit rate costs and/or distortion costs for different options. In particular, the general encoding control (420) decides whether to use intra-picture prediction or inter-picture prediction for the units of the current picture (331). If inter-picture prediction is used for a unit, in conjunction with the motion estimator (450), the general encoding control (420) decides which reference picture(s) to use for the inter-picture prediction. The general encoding control (420) determines which reference pictures to retain in a decoded picture buffer ("DPB") or other buffer. The general encoding control (420) produces general control data (422) that indicates decisions made during encoding, so that a corresponding decoder can make consistent decisions. The general control data (422) is provided to the header formatter/entropy coder (490).

With reference to FIG. 4*b*, if a unit of the current picture (331) is predicted using inter-picture prediction, a motion estimator (450) estimates the motion of blocks of sample values of the unit with respect to one or more reference pictures. The current picture (331) can be entirely or partially coded using inter-picture prediction. When multiple reference pictures are used, the multiple reference pictures can be from different temporal directions or the same temporal direction. The motion estimator (450) evaluates candidate MVs. The motion estimator (450) can evaluate different partition patterns for motion compensation for partitions of a given unit of the current picture (331) (e.g., 2N×2N, 2N×N, N×2N, or N×N partitions for PUs of a CU in the H.265/HEVC standard). The motion estimator (450) can use one or more of the features of motion estimation described below. For example, the motion estimator (450) finds pivot points in the current picture (331), calculates hash values for the pivot points, and searches for matching areas in a previous picture. For use in hashing operations, the motion estimator (450) can create and update data structures that track hash values and locations of pivot points, as described below. Or, as another example, the motion estimator (450) calculates derivative sample values (e.g., $Y_{deriv}$ values as described below) to use in motion estimation operations. Or, as another example, the motion estimator (450) determines global motion metadata, which can be used to guide or skip later block-based motion estimation decisions or can be signaled along with encoded data in the bitstream (495). Or, as another example, the motion estimator (450) identifies regions, if any, that have changed between pictures and limits motion estimation operations to changed regions. These features of motion estimation can be used in combination or separately.

The DPB (470), which is an example of decoded picture temporary memory storage area (360) as shown in FIG. 3, buffers one or more reconstructed previously coded pictures for use as reference pictures.

The motion estimator (450) produces motion data (452) as side information. In particular, the motion data (452) can include information that indicates whether contextual motion mode (e.g., merge mode in the H.265/HEVC standard) is used and, if so, the candidate MV for contextual motion mode (e.g., merge mode index value in the H.265/HEVC standard). More generally, the motion data (452) can include MV data and reference picture selection data. The motion estimator (450) can also produce global motion metadata (457), which is provided to the header formatter/entropy coder (490), for implementations in which global motion metadata (457) is signaled as part of the bitstream (495). The motion data (452) is provided to the header formatter/entropy coder (490) as well as the motion compensator (455). The motion compensator (455) applies MV(s) for a block to the reconstructed reference picture(s) from the DPB (470) or other buffer. For the block, the motion compensator (455) produces a motion-compensated prediction, which is an area of sample values in the reference picture(s) that are used to generate motion-compensated prediction values for the block.

With reference to FIG. 4*b*, if a unit of the current picture (331) is predicted using intra-picture prediction, an intra-picture prediction estimator (440) determines how to perform intra-picture prediction for blocks of sample values of the unit. The current picture (331) can be entirely or partially coded using intra-picture prediction. If the current picture (331) is entirely coded using intra-picture prediction, it is termed a "key" picture. Otherwise (the current picture (331) is at least partially coded using inter-picture prediction), the current picture (331) is termed a "non-key" picture. Using values of a reconstruction (438) of the current picture (331), for intra spatial prediction, the intra-picture prediction estimator (440) determines how to spatially predict sample values of a block of the current picture (331) from previously reconstructed sample values of the current picture (331), e.g., selecting an intra-picture prediction mode. Or, for intra block copy mode, the intra-picture prediction estimator (440) determines how to predict sample values of a block of the current picture (331) using an offset (sometimes called a block vector) that indicates a previously encoded/decoded portion of the current picture (331). Intra block copy mode can be implemented as a special case of inter-picture prediction in which the reference picture is the current picture (331), and only previously encoded/decoded sample values of the current picture (331) can be used for prediction. As side information, the intra-picture prediction estimator (440) produces intra prediction data (442), such as the prediction mode/direction used. The intra prediction data (442) is provided to the header formatter/entropy coder (490) as well as the intra-picture predictor (445).

According to the intra prediction data (442), the intra-picture predictor (445) spatially predicts sample values of a block of the current picture (331) from previously reconstructed sample values of the current picture (331), producing intra-picture predicted sample values for the block. Or, the intra-picture predictor (445) predicts sample values of the block using intra block copy prediction, using an offset (block vector) for the block.

As shown in FIG. 4*b*, the intra/inter switch selects whether the predictions (458) for a given unit will be motion-compensated predictions or intra-picture predictions. Intra/inter switch decisions for units of the current picture (331) can be made using various criteria.

The video encoder (340) can determine whether or not to encode and transmit the differences (if any) between a block's prediction values (intra or inter) and corresponding original values. The differences (if any) between a block of the prediction (458) and a corresponding part of the original current picture (331) of the input video signal (405) provide values of the residual (418). If encoded/transmitted, the values of the residual (418) are encoded using a frequency transform (if the frequency transform is not skipped), quantization, and entropy encoding. In some cases, no residual is calculated for a unit. Instead, residual coding is skipped, and the predicted sample values are used as the reconstructed sample values.

With reference to FIG. 4*a*, when values of the residual (418) are encoded, in the transformer/scaler/quantizer (430), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of values of the residual (418) (or sample value data if the prediction (458) is null), producing blocks of frequency transform coefficients. The transformer/scaler/quantizer (430) can apply a transform with variable block sizes. In this case, the transformer/scaler/quantizer (430) can determine which block sizes of transforms to use for the residual values for a current block. For example, in H.265/HEVC implementations, the transformer/scaler/quantizer (430) can split a TU by quadtree decomposition into four smaller TUs, each of which may in turn be split into four smaller TUs, down to a minimum TU size. In H.265/HEVC implementations, the frequency transform can be skipped. In this case, values of the residual (418) can be quantized and entropy coded.

With reference to FIG. 4*a*, in the transformer/scaler/quantizer (430), a scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis, or other basis. The quantization step size can depend on a quantization parameter ("QP"), whose value is set for a picture, tile, slice, and/or other portion of video. The quantized transform coefficient data (432) is provided to the header formatter/entropy coder (490). If the frequency transform is skipped, the scaler/quantizer can scale and quantize the blocks of prediction residual data (or sample value data if the prediction (458) is null), producing quantized values that are provided to the header formatter/entropy coder (490).

As shown in FIGS. 4*a* and 4*b*, the header formatter/entropy coder (490) formats and/or entropy codes the general control data (422), quantized transform coefficient data (432), intra prediction data (442), motion data (452), global motion metadata (457) (if provided), and filter control data (462). The entropy coder of the video encoder (340) compresses quantized transform coefficient values as well as certain side information (e.g., MV information, QP values, mode decisions, parameter choices, filter parameters). Typical entropy coding techniques include Exponential-Golomb coding, Golomb-Rice coding, context-adaptive binary arithmetic coding ("CABAC"), differential coding, Huffman coding, run length coding, variable-length-to-variable-length ("V2V") coding, variable-length-to-fixed-length ("V2F") coding, Lempel-Ziv ("LZ") coding, dictionary coding, and combinations of the above. The entropy coder can use different coding techniques for different kinds of information, can apply multiple techniques in combination (e.g., by applying Exponential-Golomb coding or Golomb-Rice coding as binarization for CABAC), and can choose from among multiple code tables within a particular coding technique.

The video encoder (340) produces encoded data for the coded picture (341) in an elementary bitstream, such as the coded video bitstream (495) shown in FIG. 4*a*. In FIG. 4*a*, the header formatter/entropy coder (490) provides the encoded data in the coded video bitstream (495). The syntax of the elementary bitstream is typically defined in a codec standard or format, or extension or variation thereof. For example, the format of the coded video bitstream (495) can be a Windows Media Video format, SMPTE 421M format, MPEG-x format (e.g., MPEG-1, MPEG-2, or MPEG-4), H.26x format (e.g., H.261, H.262, H.263, H.264, H.265), VPx format, or another format, or a variation or extension thereof. After output from the video encoder (340), the elementary bitstream is typically packetized or organized in a container format, as explained below.

The encoded data in the elementary bitstream includes syntax elements organized as syntax structures. In general, a syntax element can be any element of data, and a syntax structure is zero or more syntax elements in the elementary bitstream in a specified order.

As shown in FIG. 3, the video encoder (340) also produces memory management control operation ("MMCO") signals (342) or reference picture set ("RPS") information. The RPS is the set of pictures that may be used for reference in motion compensation for a current picture or any subsequent picture. If the current picture (331) is not the first picture that has been encoded, when performing its encoding process, the video encoder (340) may use one or more previously encoded/decoded pictures (369) that have been stored in a decoded picture temporary memory storage area (360). Such stored decoded pictures (369) are used as reference pictures for inter-picture prediction of the content of the current picture (331). The MMCO/RPS information (342) indicates to a video decoder which reconstructed pictures may be used as reference pictures, and hence should be stored in a picture storage area such as the DPB (470) in FIGS. 4*a* and 4*b*.

The decoding process emulator (350) implements some of the functionality of a video decoder, for example, decoding tasks to reconstruct reference pictures. In a manner consistent with the MMCO/RPS information (342), the decoding process emulator (350) determines whether a given coded picture (341) needs to be reconstructed and stored for use as a reference picture in inter-picture prediction of subsequent pictures to be encoded. If a coded picture (341) needs to be stored (and possibly modified), the decoding process emulator (350) models the decoding process that would be conducted by a video decoder that receives the coded picture (341) and produces a corresponding decoded picture (351).

The decoding process emulator (350) may be implemented as part of the video encoder (340). For example, the decoding process emulator (350) includes certain modules and logic as shown in FIGS. 4*a* and 4*b*. During reconstruction of the current picture (331), when values of the residual (418) have been encoded/signaled, reconstructed residual values are combined with the prediction (458) to produce an approximate or exact reconstruction (438) of the original content from the video signal (405) for the current picture (331). (In lossy compression, some information is lost from the video signal (405).)

With reference to FIG. 4*a*, to reconstruct residual values, in the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the video encoder (340) combines reconstructed residual values with values of the prediction (458) (e.g., motion-compensated prediction values, intra-picture prediction values) to form the reconstruction (438). When residual values have not been encoded/signaled, the video encoder (340) uses the values of the prediction (458) as the reconstruction (438).

With reference to FIGS. 4*a* and 4*b*, for intra-picture prediction, the values of the reconstruction (438) can be fed back to the intra-picture prediction estimator (440) and intra-picture predictor (445). The values of the reconstruction (438) can be used for motion-compensated prediction of subsequent pictures. The values of the reconstruction (438) can be further filtered. A filtering control (460) determines how to perform deblock filtering and sample adaptive offset ("SAO") filtering on values of the reconstruction (438), for the current picture (331). The filtering control (460) produces filter control data (462), which is provided to the header formatter/entropy coder (490) and merger/filter(s) (465).

In the merger/filter(s) (465), the video encoder (340) merges content from different tiles into a reconstructed version of the current picture. The video encoder (340) selectively performs deblock filtering and SAO filtering according to the filter control data (462) and rules for filter adaptation, so as to adaptively smooth discontinuities across boundaries in the current picture (331). Other filtering (such as de-ringing filtering or adaptive loop filtering ("ALF"); not shown) can alternatively or additionally be applied. Tile boundaries can be selectively filtered or not filtered at all, depending on settings of the video encoder (340), and the video encoder (340) may provide syntax elements within the coded bitstream to indicate whether or not such filtering was applied.

In FIGS. 4*a* and 4*b*, the DPB (470) buffers the reconstructed current picture for use in subsequent motion-compensated prediction. More generally, as shown in FIG. 3, the decoded picture temporary memory storage area (360) includes multiple picture buffer storage areas (361, 362, . . . , 36*n*). In a manner consistent with the MMCO/RPS information (342), the decoding process emulator (350) manages the contents of the storage area (360) in order to identify any picture buffers (361, 362, etc.) with pictures that are no longer needed by the video encoder (340) for use as reference pictures. After modeling the decoding process, the decoding process emulator (350) stores a newly decoded picture (351) in a picture buffer (361, 362, etc.) that has been identified in this manner.

As shown in FIG. 3, the coded picture (341) and MMCO/RPS information (342) are buffered in a temporary coded data area (370). The coded data that is aggregated in the coded data area (370) contains, as part of the syntax of the elementary bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages). The media metadata can include global motion metadata (457) when signaled as part of the bitstream (495).

The aggregated data (371) from the temporary coded data area (370) is processed by a channel encoder (380). The channel encoder (380) can packetize and/or multiplex the aggregated data for transmission or storage as a media stream or file. Or, more generally, the channel encoder (380) can implement one or more media system multiplexing protocols or transport protocols. The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

Depending on implementation and the type of compression desired, modules of the video encoder system (300) and/or video encoder (340) can be added, omitted, split into multiple modules, combined with other modules, and/or replaced with like modules. In alternative embodiments, encoder systems or encoders with different modules and/or other configurations of modules perform one or more of the described techniques. Specific embodiments of encoder systems typically use a variation or supplemented version of the video encoder system (300). Specific embodiments of video encoders typically use a variation or supplemented version of the video encoder (340). The relationships shown between modules within the video encoder system (300) and video encoder (340) indicate general flows of information in the video encoder system (300) and video encoder (340), respectively; other relationships are not shown for the sake of simplicity. In general, a given module of the video encoder system (300) or video encoder (340) can be implemented by software executable on a CPU, by software controlling special-purpose hardware (e.g., graphics hardware for video acceleration), or by special-purpose hardware (e.g., in an ASIC).

IV. Example Video Decoder Systems.

FIG. 5 is a block diagram of an example video decoder system (500) in conjunction with which some described embodiments may be implemented. The video decoder system (500) includes a video decoder (550), which is further detailed in FIG. 6.

The video decoder system (500) can be a general-purpose decoding tool capable of operating in any of multiple decoding modes such as a low-latency decoding mode for real-time communication, a transcoding mode, and a higher-latency decoding mode for media playback from a file or stream, or it can be a special-purpose decoding tool adapted for one such decoding mode. The video decoder system (500) can be implemented as part of an operating system module, as part of an application library, as part of a standalone application or using special-purpose hardware. Overall, the video decoder system (500) receives coded data from a channel (510) and produces reconstructed pictures as output for an output destination (590). The received encoded data can include content encoded using one or more of the innovations described herein.

The decoder system (500) includes a channel (510), which can represent storage, a communications connection, or another channel for coded data as input. The channel (510) produces coded data that has been channel coded. A channel decoder (520) can process the coded data. For example, the channel decoder (520) de-packetizes and/or demultiplexes data that has been organized for transmission or storage as a media stream or file. Or, more generally, the channel decoder (520) can implement one or more media system demultiplexing protocols or transport protocols. The channel (510) or channel decoder (520) may also include other elements (not shown), e.g., for FEC decoding and analog signal demodulation.

The coded data (521) that is output from the channel decoder (520) is stored in a temporary coded data area (530) until a sufficient quantity of such data has been received. The coded data (521) includes coded pictures (531) and MMCO/RPS information (532). The coded data (521) in the coded data area (530) contain, as part of the syntax of an elementary coded video bitstream, coded data for one or more pictures. The coded data (521) in the coded data area (530) can also include media metadata relating to the encoded video data (e.g., as one or more parameters in one or more SEI messages or VUI messages). The media metadata can include global motion metadata (657) when signaled as part of the bitstream (605), as explained with reference to FIG. 6.

In general, the coded data area (530) temporarily stores coded data (521) until such coded data (521) is used by the video decoder (550). At that point, coded data for a coded picture (531) and MMCO/RPS information (532) are transferred from the coded data area (530) to the video decoder (550). As decoding continues, new coded data is added to the coded data area (530) and the oldest coded data remaining in the coded data area (530) is transferred to the video decoder (550).

Figure 6:
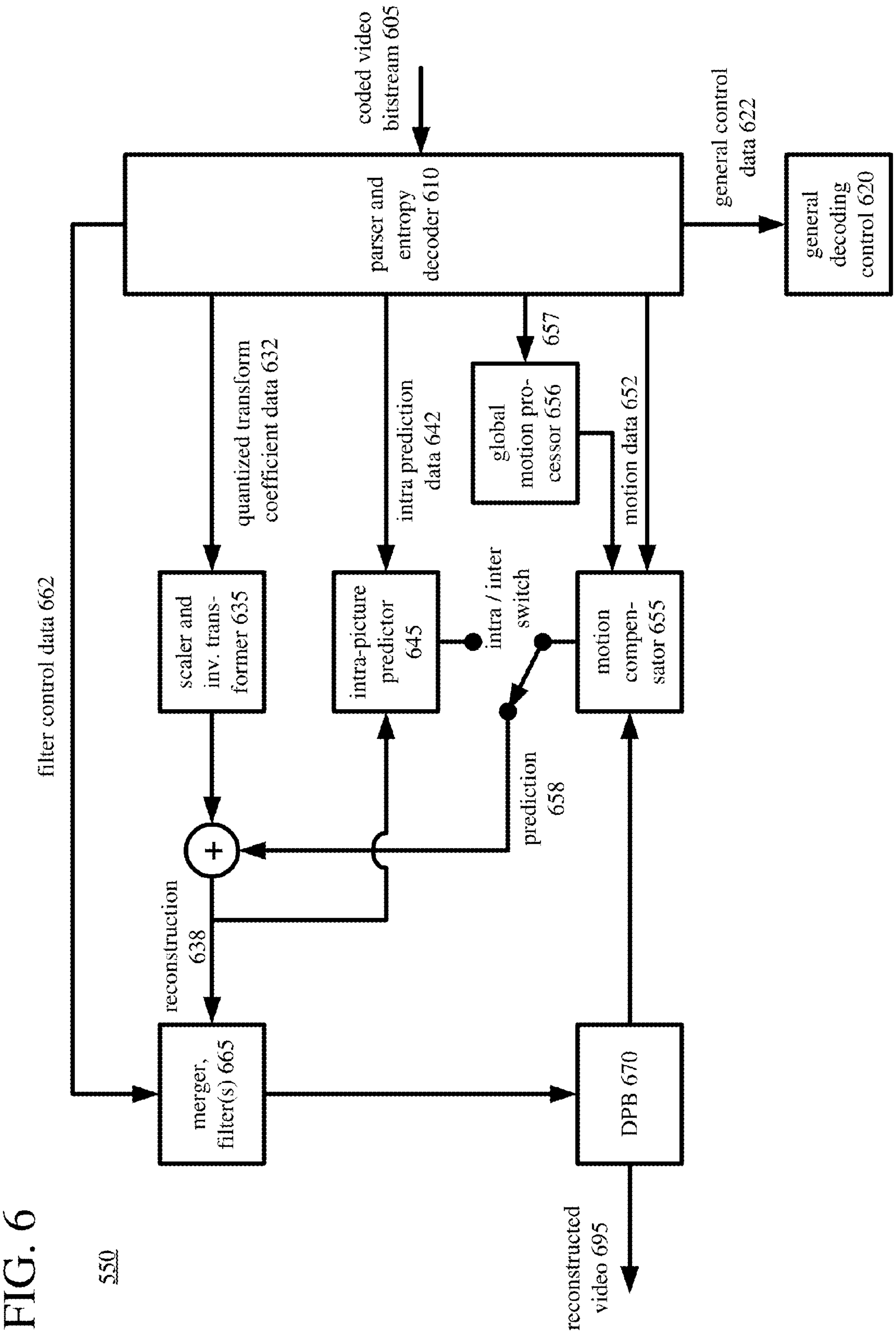
FIG. 6 is a diagram illustrating an example video decoder, in conjunction with which some described embodiments can be implemented.

The video decoder (550) decodes a coded picture (531) to produce a corresponding decoded picture (551). As shown in FIG. 6, the video decoder (550) receives the coded picture (531) as input as part of a coded video bitstream (605), and the video decoder (550) produces the corresponding decoded picture (551) as output as reconstructed video (695).

Generally, the video decoder (550) includes multiple decoding modules that perform decoding tasks such as entropy decoding, inverse quantization, inverse frequency transforms, motion compensation, intra-picture prediction, and filtering. Many of the components of the decoder (550) are used for both intra-picture decoding and inter-picture decoding. The exact operations performed by those components can vary depending on the type of information being decompressed. The format of the coded video bitstream (605) can be a Windows Media Video format, SMPTE 421M format, MPEG-x format (e.g., MPEG-1, MPEG-2, or MPEG-4), H.26x format (e.g., H.261, H.262, H.263, H.264, H.265), or VPx format, or another format, or variation or extension thereof.

A picture can be organized into multiple tiles of the same size or different sizes. A picture can also be organized as one or more slices. The content of a slice or tile can be further organized as blocks or other sets of sample values. Blocks may be further sub-divided at different stages. For example, a picture can be divided into 64×64 blocks, 32×32 blocks or 16×16 blocks, which can in turn be divided into smaller blocks of sample values. In implementations of decoding for the H.264/AVC standard, for example, a picture is divided into MBs and blocks. In implementations of decoding for the H.265/HEVC standard, for example, a picture is split into CTUs (CTBs), CUs (CBs), PUs (PBs) and TUs (TBs).

With reference to FIG. 6, a buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the video encoder (340) (e.g., context-adaptive binary arithmetic decoding with binarization using Exponential-Golomb or Golomb-Rice). As a result of parsing and entropy decoding, the parser/entropy decoder (610) produces general control data (622), quantized transform coefficient data (632), intra prediction data (642) (e.g., intra-picture prediction modes), motion data (652), global motion metadata (657) (if provided), and filter control data (662).

The general decoding control (620) receives the general control data (622). The general decoding control (620) provides control signals (not shown) to other modules (such as the scaler/inverse transformer (635), intra-picture predictor (645), motion compensator (655), and intra/inter switch) to set and change decoding parameters during decoding.

With reference to FIG. 5, as appropriate, when performing its decoding process, the video decoder (550) may use one or more previously decoded pictures (569) as reference pictures for inter-picture prediction. The video decoder (550) reads such previously decoded pictures (569) from a decoded picture temporary memory storage area (560), which is, for example, DPB (670).

With reference to FIG. 6, if the current picture is predicted using inter-picture prediction, a motion compensator (655) receives the motion data (652), such as MV data, reference picture selection data and merge mode index values. The motion compensator (655) applies MVs to the reconstructed reference picture(s) from the DPB (670). The motion compensator (655) produces motion-compensated predictions for inter-coded blocks of the current picture.

If global motion data (657) has been provided, a global motion processor (656) can interpret the global motion data (657) and assign motion data for partitions covered by the global motion data (657). For example, for partitions in a global motion area, the global motion processor (656) assigns MV data based on the global motion metadata (657). The motion data is passed to the motion compensator (655) for normal processing.

In a separate path within the video decoder (550), the intra-picture predictor (645) receives the intra prediction data (642), such as information indicating the prediction mode/direction used. For intra spatial prediction, using values of a reconstruction (638) of the current picture, according to the prediction mode/direction, the intra-picture predictor (645) spatially predicts sample values of a current block of the current picture from previously reconstructed sample values of the current picture. Or, for intra block copy mode, the intra-picture predictor (645) predicts the sample values of a current block using previously reconstructed sample values of a reference block, which is indicated by an offset (block vector) for the current block.

The intra/inter switch selects values of a motion-compensated prediction or intra-picture prediction for use as the prediction (658) for a given block. For example, when H.265/HEVC syntax is followed, the intra/inter switch can be controlled based on a syntax element encoded for a CU of a picture that can contain intra-predicted CUs and inter-predicted CUs. When residual values have been encoded/signaled, the video decoder (550) combines the prediction (658) with reconstructed residual values to produce the reconstruction (638) of the content from the video signal. When residual values have not been encoded/signaled, the video decoder (550) uses the values of the prediction (658) as the reconstruction (638).

The video decoder (550) also reconstructs prediction residual values. To reconstruct the residual when residual values have been encoded/signaled, the scaler/inverse transformer (635) receives and processes the quantized transform coefficient data (632). In the scaler/inverse transformer (635), a scaler/inverse quantizer performs inverse scaling and inverse quantization on the quantized transform coefficients. The scaler/inverse transformer (635) sets values for QP for a picture, tile, slice and/or other portion of video based on syntax elements in the bitstream. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values. The video decoder (550) combines reconstructed prediction residual values with prediction values of the prediction (658), producing values of the reconstruction (638).

For intra-picture prediction, the values of the reconstruction (638) can be fed back to the intra-picture predictor (645). For inter-picture prediction, the values of the reconstruction (638) can be further filtered. In the merger/filter(s) (665), the video decoder (550) merges content from different tiles into a reconstructed version of the picture. The video decoder (550) selectively performs deblock filtering and SAO filtering according to the filter control data (662) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the video decoder (550) or a syntax element within the encoded bitstream data. The DPB (670) buffers the reconstructed current picture for use as a reference picture in subsequent motion-compensated prediction.

The video decoder (550) can also include a post-processing filter. The post-processing filter can include deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter is applied to reconstructed sample values outside of the motion compensation loop, before output for display.

With reference to FIG. 5, the decoded picture temporary memory storage area (560) includes multiple picture buffer storage areas (561, 562, . . . , **56*n*). The decoded picture storage area (560) is, for example, the DPB (670). The decoder (550) uses the MMCO/RPS information (532) to identify a picture buffer (561, 562, etc.) in which it can store a decoded picture (551). The decoder (550) stores the decoded picture (551) in that picture buffer. The decoder (550) also determines whether to remove any reference pictures from the multiple picture buffer storage areas (561, 562, . . . , 56*n***).

An output sequencer (580) identifies when the next picture to be produced in display order (also called output order) is available in the decoded picture storage area (560). When the next picture (581) to be produced in display order is available in the decoded picture storage area (560), it is read by the output sequencer (580) and output to the output destination (590) (e.g., display). In general, the order in which pictures are output from the decoded picture storage area (560) by the output sequencer (580) (display order) may differ from the order in which the pictures are decoded by the decoder (550) (bitstream order).

Depending on implementation and the type of decompression desired, modules of the video decoder system (500) and/or video decoder (550) can be added, omitted, split into multiple modules, combined with other modules, and/or replaced with like modules. In alternative embodiments, decoder systems or decoders with different modules and/or other configurations of modules perform one or more of the described techniques. Specific embodiments of decoder systems typically use a variation or supplemented version of the video decoder system (500). Specific embodiments of video decoders typically use a variation or supplemented version of the video decoder (550). The relationships shown between modules within the video decoder system (500) and video decoder (550) indicate general flows of information in the video decoder system (500) and video decoder (550), respectively; other relationships are not shown for the sake of simplicity. In general, a given module of the video decoder system (500) or video decoder (550) can be implemented by software executable on a CPU, by software controlling special-purpose hardware (e.g., graphics hardware for video acceleration), or by special-purpose hardware (e.g., in an ASIC).

V. Motion Estimation Adapted for Screen Remoting Scenarios.

In screen remoting scenarios, screen capture video shows a screen or window of a graphical user interface as it changes over time. In typical screen capture video, text and embedded images are scrolled horizontally or vertically from time to time as a user navigates through content. As a user adds text, previous content can be shifted horizontally or vertically. A user can also move a window including text and other content around a screen. In many cases, previous approaches to motion estimation for screen remoting scenarios fail to detect and encode such motion effectively.

This section describes various features of motion estimation adapted for screen remoting scenarios. In some example implementations, various features of motion estimation allow a video encoder to efficiently detect uniform motion in large, rectangular areas of content in screen capture video. For example, the video encoder detects distinctive patterns of sample values, called pivot points, in pictures of a video sequence. For a pivot point in a current picture, the video encoder detects one or more matching pivot points in a previous picture. The video encoder can use a hashing function and data structure that tracks hash values to speed up the matching process for pivot points. Then, for matched pivot points, the video encoder finds a matching area around the respective pivot points. A matching area can be very large, indicating global motion for many blocks in the matching area. Based on the motion of a matching area between the current picture and previous picture, blocks in the matching area are assigned MV values. In this way, the video encoder can quickly detect and encode large areas of exact-match blocks having uniform motion, which reduces overall latency and improves compression efficiency. For many cases, this approach to motion estimation reduces the number of time-consuming comparisons between sample values of a current block and candidate blocks, which characterize conventional block-based motion estimation.

New features of motion estimation described herein include, but are not limited to, calculating derivative sample values for motion estimation operations, hashing of sample values for pivot points, creating and updating a multi-level data structure for use in hashing operations, detecting changed regions in which motion estimation operations are performed, and detection and use of global motion metadata. These different features can be used in combination or separately.

A. Using Derivative Sample Values in Motion Estimation Operations.

As part of motion estimation, a video encoder can calculate derivative sample values to use in motion estimation operations. In this case, when performing motion estimation operations for a current picture, the video encoder calculates multiple derivative sample values for the current picture based on base sample values for the current picture. When motion estimation includes hashing of sample values for pivot points, the video encoder can use the derivative sample values to find pivot points and calculate hash values for the pivot points. Thus, derivative sample values can be used to find a pivot point in the current picture and calculate a hash value for the pivot point in the current picture, which is compared to hash values for pivot points in a previous picture (also calculated from derivative sample values).

The way that derivative sample values are calculated depends on implementation. In some approaches, the derivative sample values are $Y_{deriv}$ sample values computed with a "data hiding" mechanism from base luma (Y) sample values and chroma (U, V) sample values. A given $Y_{deriv}$ sample value is calculated by combining multiple bits of a Y sample value with at least one bit of a U sample value and at least one bit of a V sample value. For example, from 8-bit Y, U, and V sample values, an 8-bit $Y_{deriv}$ sample value is computed as:

$$Y_{deriv}=(Y \,\&\, 0xFE)+(U \,\&\, 0x01)+(V \,\&\, 0x02).$$

That is, the 6 most significant bits of the Y sample value are combined with the least significant bit of the U sample value and the second-least significant bit of the V sample value. Alternatively, a $Y_{deriv}$ sample values can have some other bit depth (e.g., 10 bits, 12 bits, or more bits per sample value). Also, a $Y_{deriv}$ sample values can be calculated from base YUV sample values having some other bit depth (e.g., 10 bits, 12 bits, or more bits per sample value).

Calculation of $Y_{deriv}$ sample values can be performed concurrently with conversion of sample values from an RGB color space to a YUV color space. For a given combination of RGB sample values, the corresponding $Y_{deriv}$ sample value provides a distinctive, representative value for motion estimation operations. Alternatively, derivative sample values can be computed directly from base sample values in an RGB color space or other color space.

By using only derivative sample values (and not base sample values), a video encoder can perform certain motion estimation operations more quickly while still detecting motion accurately. For example, a video encoder can compute pivot points and hash values using only $Y_{deriv}$ sample values (rather than YUV sample values), which provides a quick and accurate way to detect motion in screen capture video. Later motion estimation operations (e.g., sample-by-sample comparisons when hash values match) can be performed using $Y_{deriv}$ sample values or YUV sample values. In general, using YUV sample values for motion estimation operations requires more comparisons but is more accurate. Using $Y_{deriv}$ sample values is faster but potentially not as accurate.

Alternatively, a video encoder skips conversion of base sample values to derivative sample values, and instead performs motion estimation operations with the base sample values or a subset of the base sample values. For example, the video encoder performs motion estimation operations using Y, U, and V sample values when finding motion data for partitions of a current picture. Or, the video encoder performs motion estimation operations using only Y sample values when finding motion data for partitions of a current picture. Or, the video encoder finds different motion data for different color components of a current picture, using sample values of the respective color components.

B. Hashing of Sample Values for Pivot Points.

As part of motion estimation, a video encoder can calculate hash values for pivot points in pictures in order to speed up the motion estimation process, while still detecting motion effectively. In particular, by using hash values for pivot points, a video encoder can quickly detect scrolling motion and window motion in screen capture video in many cases, even when the motion has a large magnitude.

Figure 7:
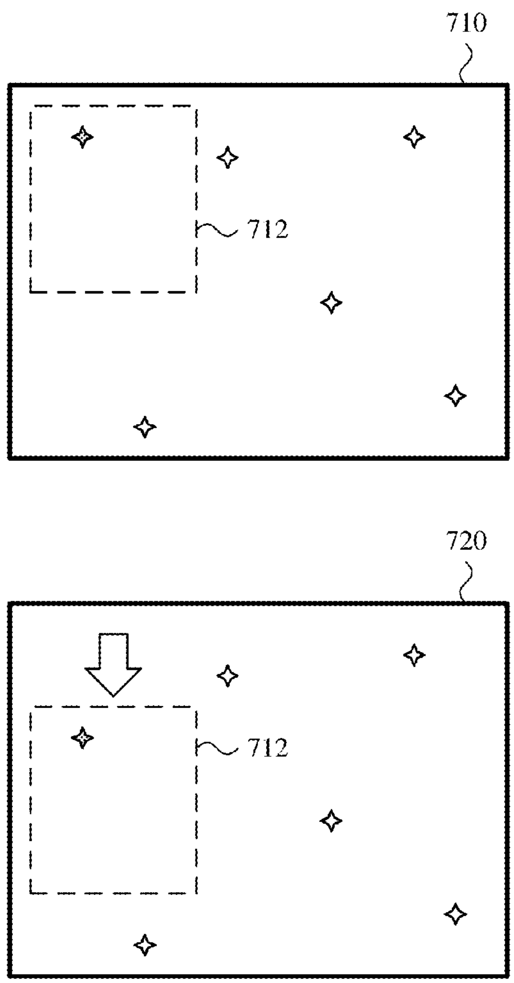
FIG. 7 is a diagram illustrating an example of motion estimation with hashing of sample values for pivot points.

FIG. 7 shows a simplified example (700) of motion estimation with hashing of sample values for pivot points. A previous picture (710) of screen capture video includes multiple pivot points spread throughout the previous picture (710). For a pivot point, a hash value for the pivot point and the location of the pivot point in the previous picture are stored. (A video encoder finds the pivot points in the previous picture (710) when encoding that picture.)

When encoding a current picture (720) of screen capture video, the video encoder finds pivot points in the current picture (720) and calculates hash values for the pivot points. For a given pivot point in the current picture (720), the video encoder checks one or more of the pivot points in the previous picture (710) for a matching hash value. In the example (700) of FIG. 7, the video encoder finds a pivot point with the same hash value in the previous picture (710). (These matching pivot points are shown shaded.) Then, the video encoder finds a matching area (712) around the matching pivot points in the current picture (720) and previous picture (710) by comparing sample values within the matching area (712). In FIG. 7, the matching area (712) exhibits global motion between the previous picture (710) and the current picture (720), e.g., due to scrolling of content within a Web browser, word processor, etc., or due to window movement. The video encoder can similarly try to find matches for other pivot points in the current picture (720). By limiting comparison operations to pivot points and, for matching pivot points, their surrounding areas, the video encoder can greatly simplify motion estimation.

Figure 8:
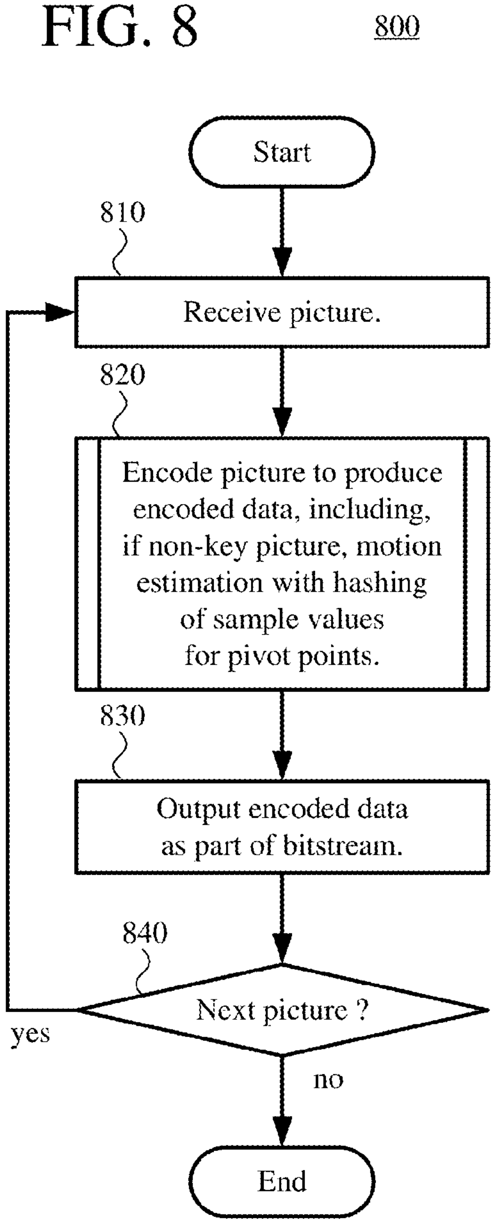
FIG. 8 is a flowchart illustrating a generalized technique for video encoding that includes, for a non-key picture, motion estimation with hashing of sample values for pivot points.

FIG. 8 shows a generalized technique (800) for video encoding that includes, for a non-key picture, motion estimation with hashing of sample values for pivot points. A video encoder as described with reference to FIGS. 3, 4*a*, and 4*b* or other video encoder can perform the technique (800).

The video encoder receives (810) a picture in a video sequence. An input buffer can be configured to receive one or more pictures for encoding. The video encoder encodes (820) the picture to produce encoded data. An output buffer can be configured to store the encoded data for output. The video encoder outputs (830) the encoded data as part of a bitstream. The video encoder checks (840) whether to continue with the next picture and, if so, receives (810) the next picture in the video sequence.

Figure 9:
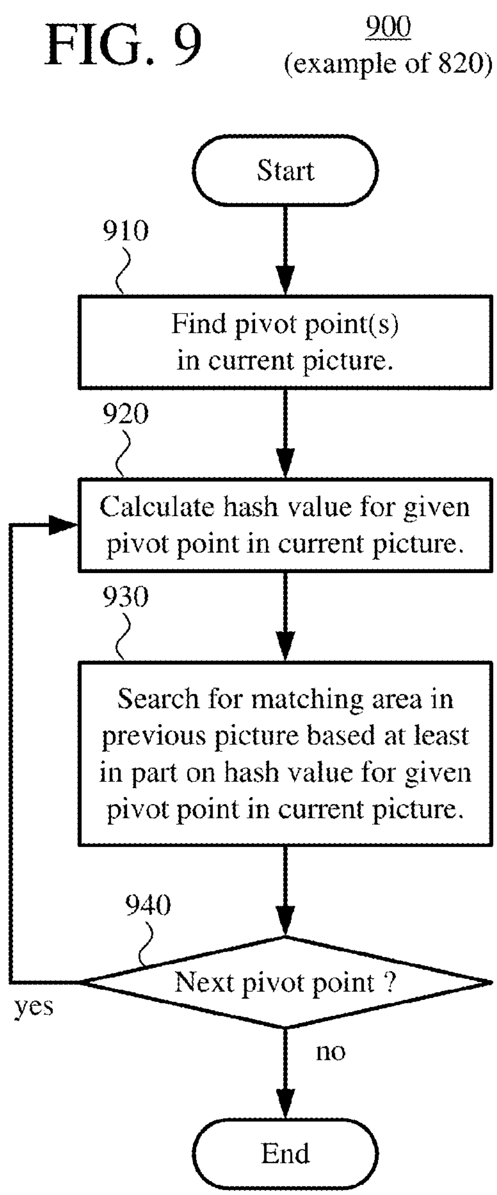
FIG. 9 is a flowchart illustrating a generalized technique for motion estimation with hashing of sample values for pivot points.

As part of the encoding (820), for a non-key picture, the video encoder performs motion estimation with hashing of sample values for pivot points. FIG. 9 shows a generalized technique (900) for motion estimation with hashing of sample values for pivot points in a current picture. As part of the motion estimation for the current picture, the video encoder finds (910) one or more pivot points in the current picture. In general, a pivot point is a distinctive pattern of sample values in a picture. Example patterns for pivot points are described in section V.D. Alternatively, the video encoder finds pivot points having other and/or additional patterns.

For a given pivot point in the current picture, the video encoder calculates (920) a hash value. The hash value can be computed using sample values in and around the pattern for the given pivot point. After that, the given pivot point can be represented using the hash value and the location of the pivot point in the picture (e.g., x, y coordinates). Example hashing functions are described in section V.E. Alternatively, the video encoder uses another hashing function to calculate hash values for pivot points.

For the given pivot point in the current picture, the video encoder searches (930) for a matching area in a previous picture based at least in part on the hash value for the pivot point in the current picture. For example, the video encoder calculates a hash index from the hash value for the pivot point in the current picture. The video encoder can calculate the hash index from the hash value for the pivot point and a bit mask. In some example implementations, an 8-bit hash index $hash_{index}$ is calculated as:

$$hash_{index}=hash_{value}\ \&\ 0xFF,$$

where $hash_{value}$ represents a full hash value having 32 bits. Alternatively, the hash index is calculated in some other way (e.g., with a shorter or longer bit mask for hash index values having a different number of bits).

The video encoder looks up the hash index in a data structure to find a list of one or more candidate pivot points in the previous picture. In general, the data structure stores hash values for pivot points detected during encoding of one or more earlier pictures in the video sequence. For each possible value of the hash index, the data structure may include a list of candidate pivot points in the previous picture that are associated with that value of the hash index, or may include no associated list of candidate pivot points (if no candidate pivot points in the previous picture are associated with that value of the hash index). In some example implementations, for a given candidate pivot point, the data structure stores the full hash value and the location of the candidate pivot point in the previous picture (e.g., x, y coordinates). Different pivot points in a list have different locations and can have different hash values. Example data structures used to manage hash values for pivot points are described in section V.C. Alternatively, the video encoder uses another data structure to manage hash values for pivot points.

When a list is found for the hash index calculated for the pivot point in the current picture, for each of at least one of the candidate pivot point(s) in the list, the video encoder compares the hash value for the pivot point in the current picture to the hash value for the candidate pivot point. In other words, the full hash values of the pivot point in the current picture and candidate pivot point in the previous picture are compared. If the hash value for the pivot point in the current picture does not match the hash value for a given candidate pivot point among the candidate pivot point(s) in the list, the video encoder checks the next candidate pivot point, if any, in the list.

On the other hand, if the hash value for the pivot point in the current picture matches the hash value for a given candidate pivot point among the candidate pivot point(s) in the list, the video encoder can compare sample values in an area around the pivot point in the current picture with corresponding sample values around the given candidate pivot point in the previous picture. For example, the video encoder checks sample values in an m×n area centered on the respective pivot points. The m×n area can be a 4×4 area, 8×8 area, or some other size of rectangular area. The video encoder can check all sample values in the area or a subset (e.g., random sampling) of the sample values in the area. The sample values that are compared can be derivative sample values (as described in section V.A) or base sample values (e.g., YUV sample values).

If the sample values in the m×n area around the pivot point in the current picture match the corresponding sample values around the given candidate pivot point in the previous picture, the video encoder can enlarge the area of comparison. For example, the video encoder doubles the size of the m×n area or otherwise increases the size of the m×n area. The increase can be uniform (e.g., plus i rows or columns in each direction) or non-uniform (plus i rows/columns in first direction, plus j rows/columns in second direction, and so on). For example, the increase can be non-uniform after the edge of the current picture or a changed region (see section V.F) is reached. The video encoder then compares multiple sample values in the enlarged area around the pivot point in the current picture with corresponding sample values around the given candidate pivot point in the previous picture. In this way, the video encoder can enlarge the area, by successively evaluating areas with increased sizes, until a stop condition occurs. For example, the stop condition is a failure to match between the sample values in the (enlarged) area around the pivot point in the current picture and the corresponding sample values around the given candidate pivot point in the previous picture. Or, the stop condition is reaching edges of a changed region (see section V.F) in all directions.

When evaluating the pivot point in the current picture, the matching area around the pivot point (first pivot point) in the current picture may expand so that it covers another pivot point (second pivot point) in the current picture. As such, when searching for a matching area, the video encoder can check whether the area around the first pivot point overlaps another (second) pivot point in the current picture. If so, the video encoder can discard the first pivot point or the second pivot point in the current picture. For example, the video encoder discards the second pivot point and continues expanding the matching area around the first pivot point. The discarded pivot point is not further considered (that is, it is not considered in later motion estimation operations for the current picture, nor is it tracked as a candidate pivot point for motion estimation operations for subsequent pictures). In this way, the video encoder can weed out pivot points that are redundant or unhelpful, so as to further speed up the motion estimation process.

When a matching area has been found (whether or not enlargement of the area has succeeded), the video encoder can check whether the matching area satisfies a threshold size, which depends on implementation. For example, the threshold size is 32×32 or some other size. If the matching area is at least as large as the threshold size, the matching area is retained as a matching area for the pivot point in the current picture. In this case, the motion associated with the matching area from the previous picture to the current picture can be used to encode partitions within the matching area. Otherwise (matching area does not satisfy threshold size), the video encoder can discard the matching area.

When a candidate pivot point does not provide a sufficient matching area (e.g., because hash values do not match, or sample values do not match, or a matching area does not satisfy the threshold size), the video encoder checks the next candidate pivot point, if any, in the list associated with the value of hash index.

This process continues until a candidate pivot point provides a sufficient matching area or the last candidate pivot point in the list is evaluated. If none of the candidate pivot point(s) in the list provides a sufficient matching area, the video encoder can perform normal encoding processes for blocks in the affected section of the current picture. Such normal encoding processes can include intra-picture compression processes and/or block-based motion estimation.

Returning to FIG. 9, after completing the process of searching (930) for a matching area in the previous picture for a given pivot point in the current picture, the video encoder checks (940) whether to continue for the next pivot point in the current picture. If so, the video encoder calculates (920) a hash value for the next pivot point in the current picture and searches (930) for a matching area in the previous picture. In this way, the video encoder performs motion estimation operations for the respective pivot points in the current picture.

C. Example Data Structures Tracking Hash Values.

Figure 10:
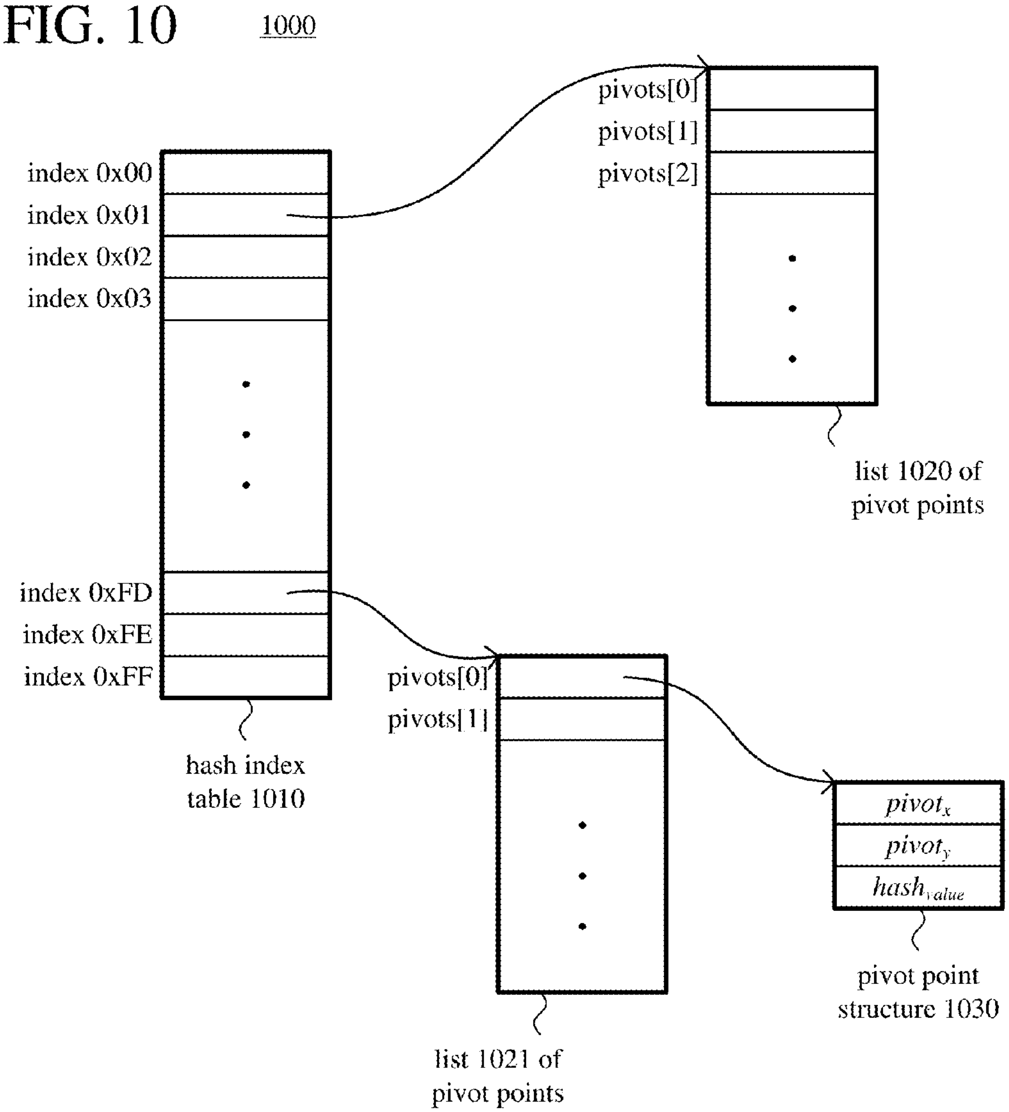
FIGS. 10 and 11 are diagrams illustrating example data structures used in motion estimation with hashing of sample values for pivot points.
Figure 11:
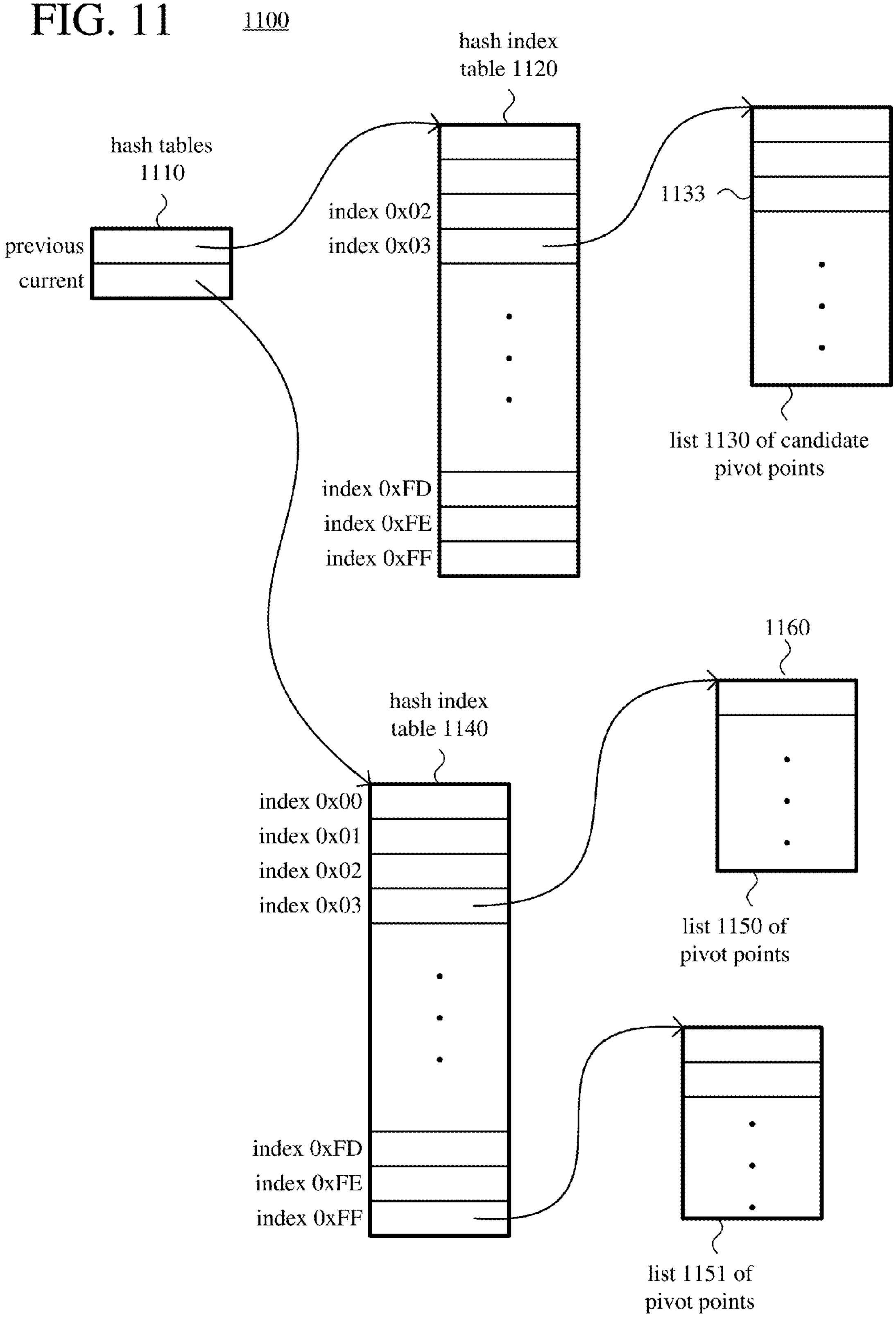

When using hash values for pivot points to speed up motion estimation, a video encoder can use data structures to track the hash values for the pivot points. FIGS. 10 and 11 show example data structures (1000, 1100) used in motion estimation with hashing of sample values for pivot points. Each of the data structures (1000, 1100) uses a multi-level, dynamic array scheme to store hash values for pivot points. This approach enables fast, accurate motion estimation by searching hash values of pivot points.

In FIG. 10, the hash index table (1010) includes an entry for each possible value of hash index. In FIG. 10, the hash index has 8 bits, and the range of values for the hash index is 0x00 to 0xFF. An entry in the hash index table (1010) can be empty or include a reference (e.g., pointer) to a list of one or more pivot points. In some example implementations, a list of pivot point(s) initially includes entries for up to eight different pivot points, but can dynamically increase in size to store information for additional pivot points. Multiple pivot points represented in a given list can have different hash values that yield the same value of hash index. By using a multi-level scheme with lists of candidate pivot points that dynamically grow, the video encoder limits size of the data structure while providing fast access for search operations.

FIG. 10 shows two lists (1020, 1021) of pivot points. One list (1020) has entries for three pivot points associated with the hash index 0x01, and the other list (1021) has entries for two pivot points associated with the hash index 0xFD. For the sake of simplicity, other lists are not shown in FIG. 10. An entry in a list (1020, 1021) can be empty or include a reference (e.g., pointer) to a structure for a pivot point.

In FIG. 10, the structure (1030) for a given pivot point includes entries for the location ($pivot_x$ and $pivot_y$) and full hash value ($hash_{value}$) of the pivot point. For the sake of simplicity, entries for other pivot points are not shown in FIG. 10. Alternatively, the fields of a pivot point can be represented as follows:

```
struct pivot {
    INT32 pivot_x;
    INT32 pivot_y;
    INT32 hash_value; }
```

A video encoder can maintain multiple hash index tables, with one hash index table storing hash values for candidate pivot points in one or more previous pictures, and another hash index table storing hash values for pivot points in the current picture. In FIG. 11, a hash table (1110) includes references (e.g., pointers) to two hash index tables (1120, 1140). Each of the hash index tables (1120, 1140) includes an entry for each possible value of hash index. In FIG. 11, the hash index has 8 bits, and the range of values for the hash index is 0x00 to 0xFF. An entry in the hash index table (1120, 1140) can be empty or include a reference (e.g., pointer) to a list of one or more pivot points. For the sake of simplicity, most lists are not shown in FIG. 11.

For the first hash index table (1120), each list includes entries for one or more candidate pivot points in the previous picture. FIG. 11 shows one list (1130) of three candidate pivot points in the previous picture, which are associated with the hash index 0x03. For each of the candidate pivot points, an entry (not shown) in the list indicates a location in the previous picture and the hash value for the candidate pivot point.

For the second hash index table (1140), each list includes entries for one or more pivot points in the current picture. FIG. 11 shows two lists (1150, 1151) of pivot points in the current picture, which are associated with the hash indices 0x03 and 0xFF, respectively. For each of the pivot points, an entry (not shown) in the list indicates a location in the current picture and the hash value for the pivot point.

When the video encoder performs motion estimation for the current picture, the video encoder populates the hash index table (1140) for pivot points in the current picture. For example, the video encoder finds a pivot point in the current picture, calculates a hash value for the pivot point, calculates hash index 0x03 for the pivot point, and stores the location and hash value for the pivot point as an entry (1160) of the list (1150) of pivot points associated with hash index 0x03. Later, when the video encoder searches for a matching area, the video encoder retrieves the list (1130) of candidate pivot points associated with the hash index 0x03. The video encoder evaluates the three candidate pivot points in the list (1130), one after the other, until it finds a candidate pivot point (1133) that yields a matching area for the pivot point (1160) in the current picture.

After motion estimation for the current picture is done, the video encoder can update the hash index tables (1120, 1140). For example, the video encoder merges pivot points from the two hash index tables (1120, 1140) into the hash index table (1120) that stores candidate pivot points for previous pictures, and initializes the hash index table (1140) for the next picture (as the current picture). Or, the video encoder merges points from the two hash index tables (1120, 1140) into the hash index table (1140) that stores pivot points for the current picture, which will be used as candidate pivot points in previous pictures, and initializes the hash index table (1120) for the next picture (as the current picture). When updating the data structure that includes the two hash index tables, the video encoder can retain at least one of the candidate pivot point(s) in the previous picture, remove at least one of the candidate pivot point(s) in the previous picture, and/or add at least one pivot point in the current picture. After the updating, the pivot points cover various sections of the current picture but redundant, outdated candidate pivot points (which have been superseded by newer pivot points in the current picture) have been removed.

D. Example Patterns for Pivot Points.

When finding pivot points in a picture, the video encoder can search for various patterns of sample values. In general, to find a pivot point in a picture (e.g., the current picture), the video encoder compares sample values for the current picture to one or more patterns. Each of the one or more patterns can be indicative of an edge, character, or other distinctive configuration of sample values. The sample values can be derivative sample values (see section V.A) or base sample values.

The video encoder can search for pivot points on a sample-by-sample basis. For example, for a current location in the picture, the video encoder checks sample values around the current location. When the video encoder finds a pivot point at the current location, the video encoder can jump ahead by an amount PIVOT_DISTANCE before searching for the next pivot point. The value of PIVOT_DISTANCE depends on implementation. For example, PIVOT_DISTANCE is a predetermined number of sample values (e.g., 10 sample values, 20 sample values, 100 sample values) in scanning order or a predefined distance horizontally and/or vertically in the current picture. In this way, the video encoder avoids finding pivot points that are packed close together, which would not be useful for motion estimation. Otherwise (the video encoder does not find a pivot point at the current location), the video encoder continues by searching for a pivot point at the next location.

Figure 12A:
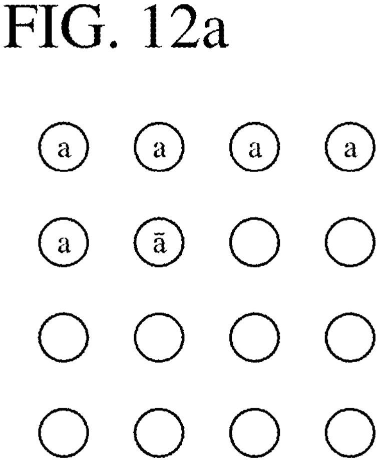
FIGS. 12*a*, 12*b*, and 12*c* are diagrams illustrating example patterns for pivot points.
Figure 12B:
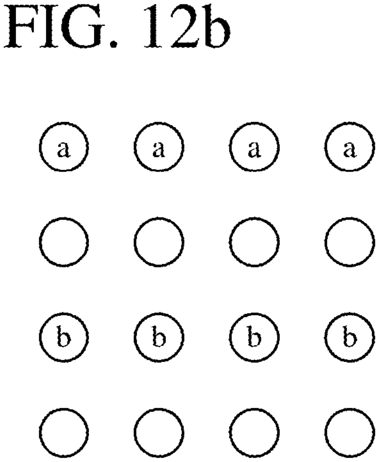
Figure 12C:
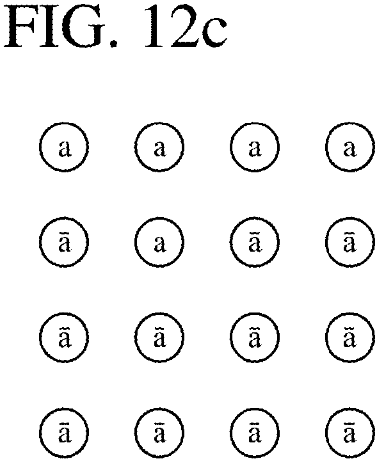

The patterns used to find pivot points depend on implementation. FIGS. 12*a*, 12*b*, and 12*c* show example patterns (1210, 1220, 1230) for pivot points. Alternatively, a video encoder uses other and/or additional patterns for pivot points.

For the first example pattern (1210), the video encoder compares sample values at five locations (shown as "a" in FIG. 12*a*) in a 4×4 arrangement and the sample value at a sixth location (shown as "ā" for "not a" in FIG. 12*a*). If the sample values at the five locations are identical, but they are different from the sample value at the sixth location, the video encoder designates the current location (which can be the sixth location or the first location of the 4×4 arrangement) as a pivot point. The following pseudocode illustrates how a video encoder can find a pivot point having the first example pattern (1210). The condition checked is:

```
if (*pSource !=*(pSource−1)&&*(pSourcePrevLine−
    1)==*(pSource−1)&&*(pSourcePrevLine−1)
    ==*pSourcePrevLine &&*(pSourcePrevLine+1)
    ==*pSourcePrevLine &&*(pSourcePrevLine+2)
    ==*pSourcePrevLine).
```

The variable pSource represents the sixth location (with sample value "ā" in FIG. 12*a*), and the variable pSourcePrevLine represents the location above the sixth location. If the sample value at the sixth location is different than the sample value to its left (at pSource−1), and the sample value at the left location (pSource−1) equals the sample values at the four locations pSourcePrevLine−1, pSourcePrevLine, pSourcePrevLine+1, pSourcePrevLine+2, then the video encoder designates the sixth location (pSource) to be a pivot point.

Variations of the first example pattern (1210) can include rotations of the example pattern (1210) by 90 degrees, 180 degrees, and/or 270 degrees, as well as mirror images of those patterns when flipped along a vertical axis of symmetry or horizontal axis of symmetry.

For the second example pattern (1220), the video encoder compares sample values in a first row and a third row of a 4×4 arrangement. If the four sample values within the first row are identical (shown as "a" in FIG. 12*b*) and the four sample values within the third row are identical (shown as "b" in FIG. 12*b*), but the sample values within the first row are different than the sample values within the third row (a <>b), the video encoder designates the current location as a pivot point. The current location can be the first location of the 4×4 arrangement.

Variations of the second example pattern (1220) can include rotations of the example pattern (1220) by 90 degrees, 180 degrees, and/or 270 degrees.

For the third example pattern (1230), the video encoder compares sample values at locations of a 4×4 arrangement. If the sample values at the four locations in the first row and second location of the second row (shown as "a" in FIG. 12*c*) are identical, but they are different from all other sample values in the 4×4 arrangement (shown as "a" for "not a" in FIG. 12*c*), the video encoder designates the current location as a pivot point. The sample values that are "not a" can have different values from each other. The current location can be the first location of the 4×4 arrangement. Variations of the third example pattern (1230) can include rotations of the example pattern (1230) by 90 degrees, 180 degrees, and/or 270 degrees, as well as mirror images of those patterns when flipped along a vertical axis of symmetry or horizontal axis of symmetry.

E. Example Hash Functions.

When calculating hash values for pivot points, the video encoder uses a hashing function. The hashing function depends on implementation. The hashing function can yield a hash value with 32 bits, 64 bits, or some other number of bits, depending on implementation. For example, the hashing function yields a hash value (hash_value) based on sample values around a pivot point as shown in the following pseudocode.

```
INT32 StrToHash_C(const BYTE *pData, INT len) {
  INT32 hash_value = 5381;
  INT32 c;
  for (INT32 i = 0; i < len; i++, pData++) {
    c = *pData;
    hash_value = (hash_value << 5) + hash_value + c; }
  return hash_value; }
```

In this hashing function, the hash value (hash_value) is calculated from a string of sample values starting at pData, where the length of the string is len. The length can be 8, 16, or some other number of sample values. The sample values that contribute to the hashing function are not necessarily the same as the sample values evaluated according to a pattern for the pivot point, but they can be the same. For example, the sample values that contribute to the hashing function can be the 16 sample values of a 4×4 arrangement of sample values in one of the example patterns (1210, 1220, 1230) shown in FIGS. 12*a*, 12*b*, and 12*c*, respectively.

Alternatively, the video encoder uses a Cantor pairing function as the hashing function. The Cantor pairing function is generally defined as:

$$hash\_value=((d0+d1)*(d0+d1+1))/2+d1,$$

where d0 and d1 represent a pair of input values combined according to the Cantor pairing function. When the Cantor pairing function accepts 32-bit input values, a group of four 8-bit sample values (e.g., in a single row or single column) can be combined into a single 32-bit value for input to the hashing function. Thus, for the example pattern (1210, 1220, 1230) shown in FIG. 12*a*, 12*b*, or 12*c*, d0 can contain the four 8-bit sample values of the first row, and d1 can contain the four 8-bit sample values of the second row. Or, for the example pattern (1220) shown in FIG. 12*b*, d0 can contain the four 8-bit sample values of the first row, and d1 can contain the four 8-bit sample values of the third row. Sample values in more lines (rows, columns) of sample values can be combined successively according to the Cantor pairing function. For example, for the example pattern (1230) shown in FIG. 12*c*, the video encoder can calculate a first hash value using d0 equal to the four 8-bit sample values of the first row and d1 equal to the four 8-bit sample values of the second row, calculate a second hash value using d0 equal to the four 8-bit sample values of the third row and d1 equal to the four 8-bit sample values of the fourth row, and then calculate a third hash value with the first hash value as d0 and second hash value as d1. In general, the sample values that contribute to the Cantor pairing function can, but need not, be the same as the sample values evaluated according to a pattern for the pivot point.

Alternatively, the video encoder uses a murmur hashing function. For the murmur hashing function, the sample values that contribute the "key" value can, but need not, be the same as the sample values evaluated according to a pattern for the pivot point. For example, for the example pattern (1210, 1220, 1230) shown in FIG. 12*a*, 12*b*, or 12*c*, the video encoder can combine sample values of the first row, second row, third row, and/or fourth row, depending on implementation, to provide the key value for the murmur hashing function. The seed value for the murmur hashing function can be a random value or defined value for the video encoder.

Alternatively, the video encoder uses a different hashing function.

F. Examples of Detecting Changed Regions for Motion Estimation.

As part of motion estimation for a current picture, a video encoder can identify one or more changed regions in the current picture relative to the previous picture. The video encoder can then limit motion estimation operations to be within the changed region(s). For example, when motion estimation includes hashing of sample values for pivot points (see section V.B), the video encoder can find pivot points in the changed region(s) of the current picture, evaluating only sample values within the changed region(s) of the current picture and ignoring sample values outside the changed region(s) of the current picture. Other (unchanged) regions of the current picture can be encoded using inter-picture prediction without motion estimation, by copying from the previous picture.

Figure 13:
FIG. 13 is a diagram illustrating an example of changed regions in which motion estimation is performed.
Figure 13:
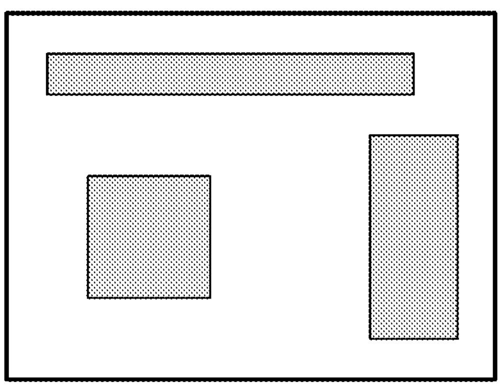

When it starts video encoding, or periodically during encoding, the video encoder encodes a key picture. Although the video encoder does not perform motion estimation when encoding the key picture, the video encoder can find pivot points in the key picture to use in subsequent encoding. As shown in FIG. 13, for a key picture (1310), the video encoder finds pivot points in the entire picture. Then, for a non-key picture (1320), the video encoder detects changed regions in the picture (1320) relative to the previous picture (key picture (1310) in FIG. 13). The changed regions are shown as shaded regions in FIG. 13. The video encoder finds pivot points in the changed regions and performs motion estimation using the pivot points in the changed regions of the non-key picture (1320).

The video encoder can detect changed regions in the current picture in various ways. For example, the video encoder can detect changed regions using hint information provided by a rendering engine or other component of an operating system, which records the hint information when rendering images to a screen for display and capturing the images for encoding. As pictures of screen capture video are provided to the video encoder, the video encoder also receives the corresponding hint information for those pictures. The hint information can be a list of candidate changed rectangles, which might or might not include content changed from the previous picture to the current picture. During color space conversion (e.g., when converting sample values from an RGB sample space to a YUV sample space), the video encoder can check for differences in sample values within the candidate changed regions (identified in the hint information) to determine which rectangles actually changed.

Alternatively, the video encoder can detect changed regions using sample-by-sample comparisons, without using hint information provided by the operating system.

When the video encoder uses a multi-level data structure to track hash values for pivot points (see section V.C), the video encoder can consider which regions of the current picture have changed relative to the previous picture when updating the data structure. For example, if the data structure includes a list of one or more candidate pivot points in the previous picture, the video encoder retains any of the candidate pivot point(s) in the previous picture that is outside the changed region(s), removes any of the candidate pivot point(s) in the previous picture that is inside the changed region(s), and adds at least one pivot point in the current picture that is inside the changed region(s). In this way, the video encoder merges pivot points in the previous picture and current picture, keeping the pivot points in the previous picture that are outside the changed region(s) but replacing pivot points in the previous picture that are inside the changed region(s). After the update, the data structure includes retained pivot points for unchanged regions and newly added pivot points for the changed regions.

Alternatively, the video encoder can skip detection of changed regions, performing motion estimation for all parts of the current picture. This can be much slower, however, and typically does not detect much additional motion between pictures.

G. Examples of Global Motion Metadata.

As part of motion estimation for a current picture, a video encoder can aggregate local motion information for multiple smaller areas into global motion metadata for a larger area that includes the multiple smaller areas. The video encoder can successively enlarge a matching area (as described in section V.B) or combine multiple adjacent areas having the same motion into a larger matching area.

Either way, the video encoder can use the global motion metadata to skip block-based motion estimation operations for multiple partitions of the current picture. For example, the video encoder assigns MVs for the multiple partitions based on the global motion metadata covering the area that includes the multiple partitions. The MVs are then encoded normally according to a standard or format. In this way, the video encoder can quickly make motion estimation decisions for the partitions while producing a bitstream that conforms to the standard or format.

Alternatively, the video encoder can set syntax elements based on the global motion metadata and signal the syntax elements as part of the bitstream (e.g., in an SEI message). When a video decoder decodes the current picture, during a pre-processing stage, the video decoder can parse the syntax elements from the bitstream, determine the global motion metadata from the syntax elements, and assign MVs for partitions of the current picture in the area covered by the global motion metadata. Then, during regular decoding (conforming to a standard or format according to which MVs are signaled in the bitstream), the video decoder can perform motion compensation for the partitions. Signaling global motion metadata in this way potentially provides an efficient way to signal motion data for partitions of the current picture, reducing the bitrate used by the motion data.

Alternatively, the video decoder can perform global motion compensation based on the global motion metadata. In this case, when a video decoder decodes the current picture, during a pre-processing stage, the video decoder can parse the syntax elements from the bitstream and determine the global motion metadata from the syntax elements. Then, the video decoder can perform global motion compensation for the entire area covered by the global motion metadata, potentially processing all of the partitions in the area in a single pass. The video decoder can skip motion compensation for individual partitions within the area covered by global motion metadata.

The area covered by global motion metadata can be a rectangle that aligns with MBs (for H.264 encoding/decoding) or CUs (for H.265 encoding/decoding). Or, the area covered by global motion metadata can be a rectangle that aligns with smaller units (e.g., partitions for H.264 encoding/decoding or H.265 encoding/decoding), but is shifted relative to MB boundaries or CU boundaries. Thus, for example, the rectangle can be enlarged, merged, etc. such that it aligns with arbitrary 4×4 partitions in the current picture (for H.264 encoding/decoding) or potentially smaller partitions for other standards/formats.

H. Example Combined Implementations.

Figure 14A:
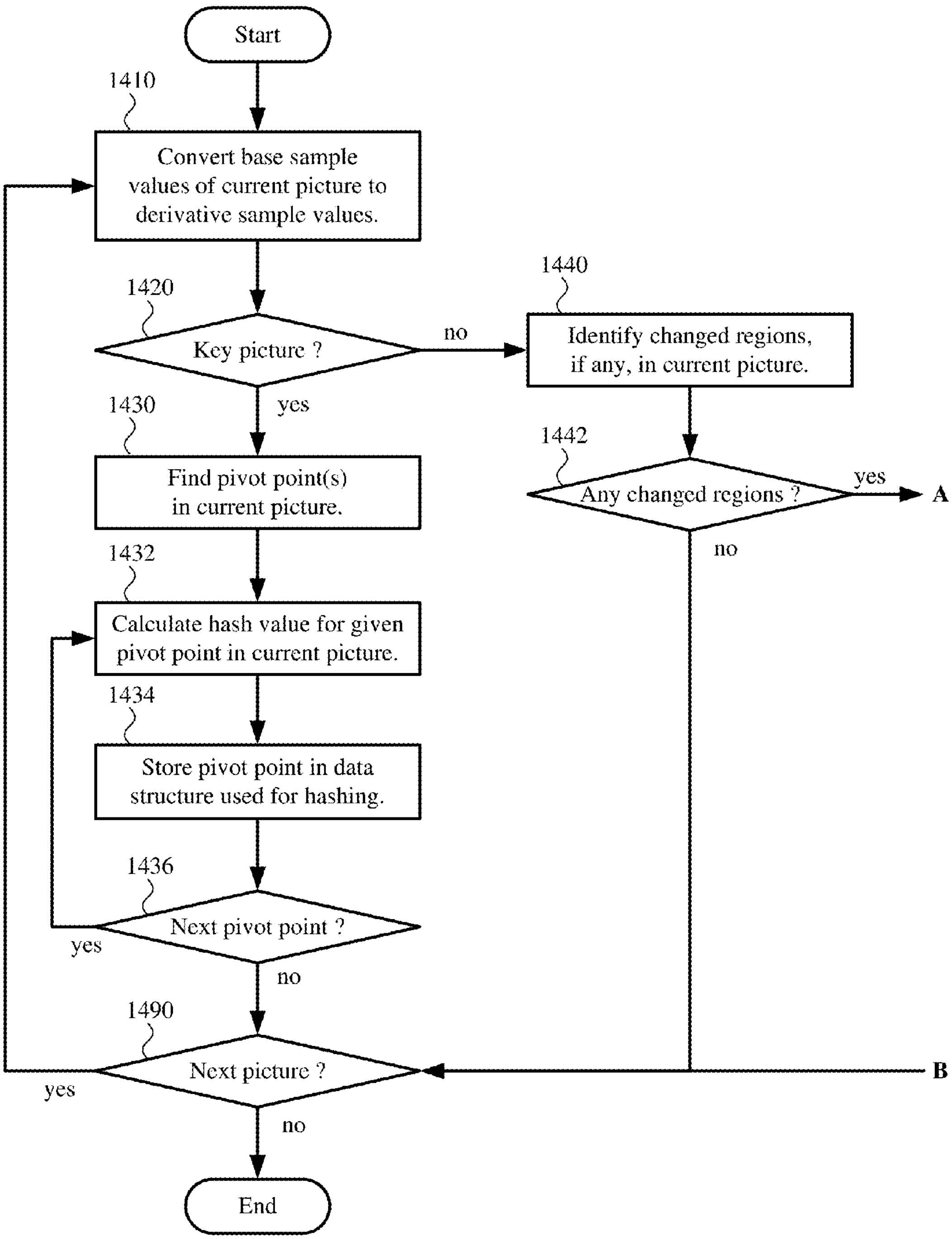
FIGS. 14*a* and 14*b* are a flowchart illustrating an example technique for video encoding that includes motion estimation with hashing of sample values for pivot points for changed regions of a current picture.
Figure 14B:
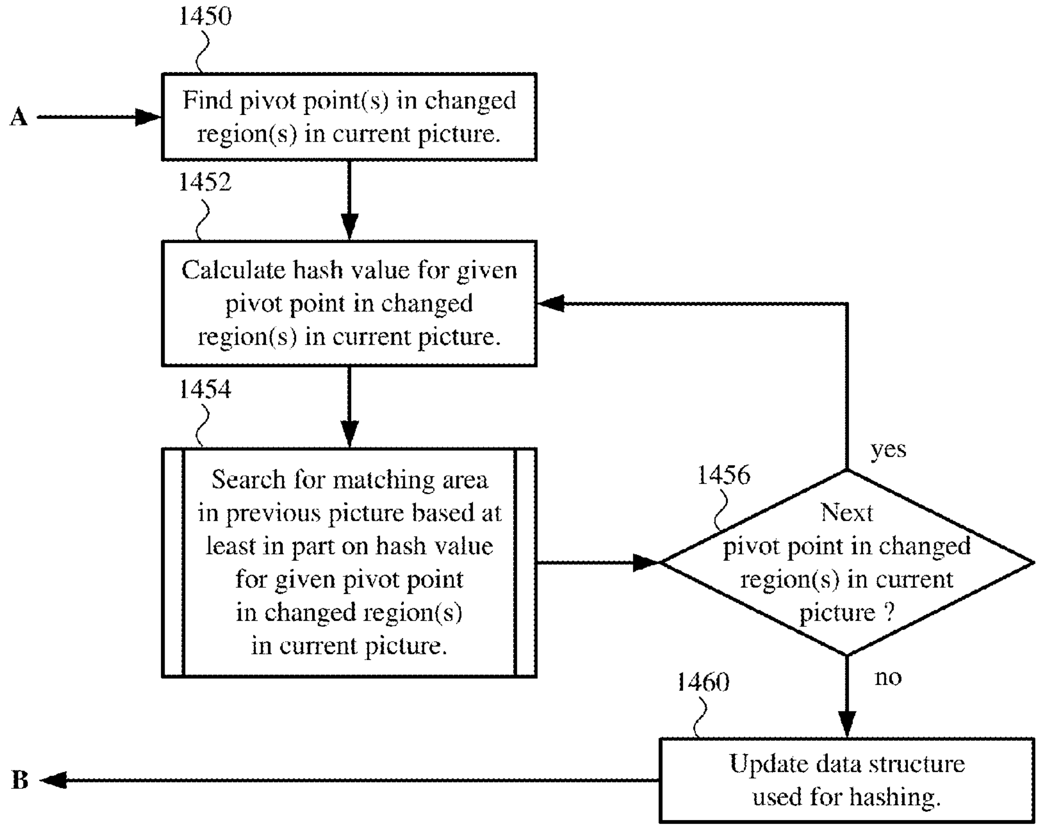

A video encoder can use the preceding features of motion estimation in combination. FIGS. 14*a* and 14*b* show an example technique (1400) for video encoding that includes motion estimation with hashing of derivative sample values for pivot points for changed regions of a current picture. A video encoder as described with reference to FIGS. 3, 4*a*, and 4*b* or other video encoder can perform the technique (1400).

The video encoder receives a picture (current picture) in a video sequence and converts (1410) base sample values of the current picture to derivative sample values. For example, the video encoder performs conversion operations as described in section V.A.

The video encoder checks (1420) whether the current picture is a key picture. If so, the video encoder finds (1430) one or more pivot points (if any) in the current picture (see sections V.B and V.D). For a key picture, the video encoder assumes the entire picture is new (entire picture is a changed region) and attempts to find pivot points throughout the picture. For each of the pivot point(s) in the current picture, the video encoder calculates (1432) a hash value for the pivot point in the current picture and stores (1434) the pivot point in a data structure used for hashing (see section V.C). For example, as described in section V.C, the video encoder calculates a hash index from the hash value (e.g., hash value & 0xFF), determines a list of pivot points associated with the hash index, and stores the hash value and location of the pivot point in the list. The video encoder checks (1436) whether to continue with the next pivot point found in the current picture and, if so, calculates (1432) the hash value for that pivot point. In this way, the video encoder finds the pivot point(s) in the current picture and populates the data structure used for hashing.

The video encoder encodes the current picture normally (with intra-picture compression) and outputs the encoded data for the current picture in a bitstream. The current picture is designated as the previous picture, for purposes of motion estimation of a subsequent picture. The video encoder checks (1490) whether to continue with the next picture in the video sequence and, if so, receives the next picture (as the current picture).

If the current picture is not a key picture (at decision 1420), the video encoder attempts to encode the current picture using inter-picture compression. The video encoder identifies (1440) changed regions, if any, in the current picture (see section V.F). The video encoder checks (1442) whether any changed regions were identified. If no changed regions were identified, the video encoder encodes the current picture using simple inter-picture prediction without motion estimation (copying sections of the previous picture) and outputs the encoded data for the current picture in the bitstream. Then, the video encoder checks (1490) whether to continue with the next picture in the video sequence and, if so, receives the next picture (as the current picture).

Figure 15A:
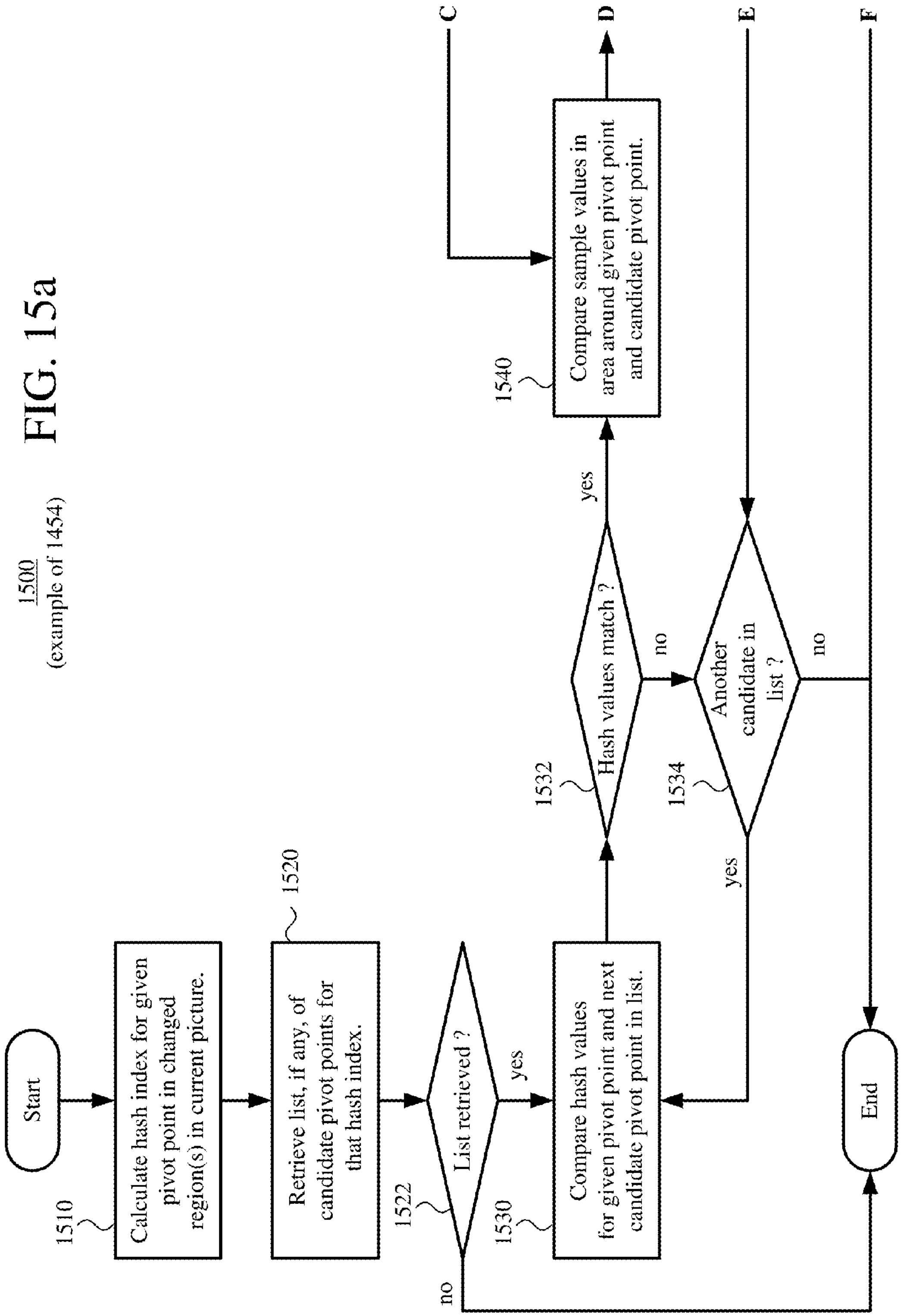
FIGS. 15*a* and 15*b* are a flowchart illustrating an example technique for searching for a matching area in a previous picture based at least in part on a hash value for a pivot point in a changed region of a current picture.
Figure 15B:
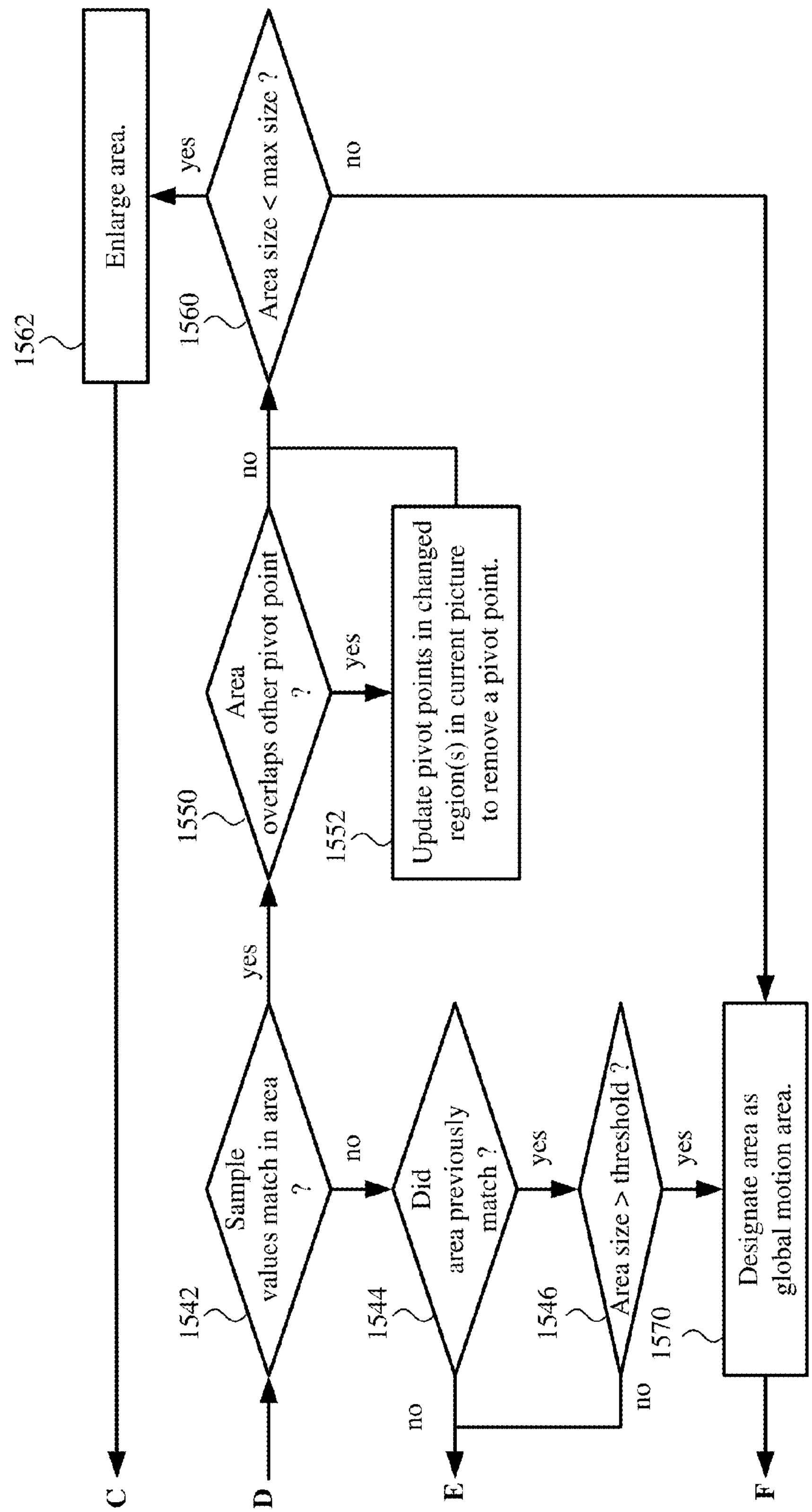

Otherwise, if changed regions are identified (at decision 1442), the video encoder finds (1450) one or more pivot points (if any) in the changed region(s) in the current picture (see sections V.B and V.D). For each of the pivot point(s) in the changed region(s) in the current picture, the video encoder calculates (1452) a hash value for the pivot point and searches (1454) for a matching area, if any, in the previous picture based at least in part on the hash value for the pivot point. As explained below, FIGS. 15*a* and 15*b* show an example technique (1500) for searching for the matching area in the previous picture. The video encoder checks (1456) whether to continue with the next pivot point found in the changed region(s) in the current picture. If so (that is, there is at least one pivot point left to evaluate), the video encoder calculates (1452) the hash value for the next pivot point in the changed region(s) in the current picture and searches (1454) for a matching area. In this way, the video encoder finds the pivot point(s) in the current picture, populates the data structure used for hashing with the pivot point(s) in the current picture, and performs motion estimation operations using the pivot point(s) in the data structure (from the current picture and previous picture(s)).

Using the results of the motion estimation operations, the video encoder encodes the current picture with inter-picture compression (if successful) or intra-picture compression (otherwise) and outputs the encoded data for the current picture in the bitstream. In particular, when matching areas have been found, partitions in the matching areas are assigned MVs and encoded using motion compensation. When matching areas have not been found, partitions can be encoded using conventional block-based motion estimation or intra-picture compression. The video encoder updates (1460) the data structure used for hashing, as described in sections V.C. and V.F. The current picture is designated as the previous picture, for purposes of motion estimation of a subsequent picture. The video encoder checks (1490) whether to continue with the next picture in the video sequence and, if so, receives the next picture (as the current picture).

With reference to FIGS. 15*a* and 15*b*, as described in sections V.B and V.C, the video encoder calculates (1510) a hash index from the hash value for the pivot point in the current picture (e.g., hash value & 0xFF) and retrieves (1520) a list, if any, of candidate pivot points (in the previous picture) associated with the hash index from the data structure used for hashing. The video encoder checks (1522) whether a list of candidate pivot point(s) in the previous picture was retrieved. If not, the video encoder finishes searching (1454) for the pivot point in the current picture, and checks (1456) whether to continue with the next pivot point found in the changed region(s) in the current picture, as shown in FIG. 14*b*.

On the other hand, if a list of candidate pivot point(s) in the previous picture was retrieved, the video encoder compares (1530) the hash value for the pivot point in the changed region(s) in the current picture against the hash value for the next candidate pivot point in the list. If the hash values match (at decision 1532), the video encoder compares (1540) sample values in an area around the pivot point in the current picture and corresponding sample values around the candidate pivot point in the previous picture, as described in section V.B. For example, the area for comparison of sample values is a rectangular area. If the sample values match in the area (at decision 1542), the video encoder checks (1550) whether the area overlaps another pivot point. If so, the video encoder updates (1552) the pivot points in the changed region(s) in the current picture to remove a pivot point (as being unhelpful), as described in section V.B. The video encoder continues by checking (1560) whether the size of the matching area is less than a maximum size. If so, the video encoder enlarges (1562) the area and compares (1540) sample values in the enlarged area around the pivot point in the current picture and corresponding sample values around the candidate pivot point in the previous picture.

Otherwise (the matching area has reached the maximum size), the video encoder designates (1570) the matching area as a global motion area, which will be encoded by assigning MVs to partitions based on the motion of the global motion area, and continues (at 1456) by evaluating the next pivot point, if any, in the changed region(s) in the current picture.

If the sample values do not match in the area (at decision 1542), the video encoder checks (1544) whether an area previously matched. If so, the video encoder checks (1546) whether the size of that matching area has satisfied a threshold size. If so, the video encoder designates (1570) the matching area as a global motion area, which will be encoded by assigning MVs to partitions based on the motion of the global motion area, and continues (at 1456) by evaluating the next pivot point, if any, in the changed region(s) in the current picture.

If there was no previous matching area (at decision 1544), or if the area size of a previous matching area did not satisfy the threshold size (at decision 1546), or if hash values do not match between the pivot points being compared (at decision 1532), the video encoder checks (1534) whether there is another candidate pivot point in the list. If so, the encoder compares (1530) the hash value for the pivot point in the changed region(s) in the current picture against the hash value for the next candidate pivot point in the list. Otherwise (no more candidate pivot points to evaluate in the list), the motion estimation using pivot points fails, and conventional block-based motion estimation or intra-picture compression can be used instead.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising:

an input buffer configured to receive multiple pictures in a video sequence;

a video encoder configured to perform encoding of the multiple pictures to produce encoded data, wherein the encoding includes performing motion estimation for a current picture of the multiple pictures, the motion estimation for the current picture including:

finding a pivot point in the current picture;

calculating a hash value for the pivot point in the current picture; and searching for a matching area in a previous picture based at least in part on the hash value for the pivot point in the current picture; and an output buffer configured to store the encoded data for output as part of a bitstream.

2. The computer system of claim 1, wherein the motion estimation for the current picture further includes calculating multiple derivative sample values for the current picture based on base sample values for the current picture, the derivative sample values being used to find the pivot point in the current picture and to calculate the hash value for the pivot point in the current picture.

3. The computer system of claim 2, wherein a given derivative sample value, among the multiple derivative sample values, is calculated by combining multiple bits of a base luma sample value with at least one bit of a first base chroma sample value and at least one bit of a second base chroma sample value.

4. The computer system of claim 1, wherein the finding the pivot point in the current picture includes comparing sample values for the current picture to one or more patterns, each of the one or more patterns being indicative of an edge or character.

5. The computer system of claim 1, wherein the calculating the hash value uses a hashing function, and wherein the hashing function is a Cantor pairing function.

6. The computer system of claim 1, wherein the searching for the matching area includes:

calculating a hash index from the hash value for the pivot point in the current picture;

looking up the hash index in a data structure to find a list of one or more candidate pivot points in the previous picture; and for each of at least one of the one or more candidate pivot points, comparing the hash value for the pivot point in the current picture to a hash value for the candidate pivot point.

7. The computer system of claim 6, wherein the list includes, for each of the one or more candidate pivot points, a location in the previous picture and the hash value for the candidate pivot point.

8. The computer system of claim 6, wherein the searching for the matching area further includes:

when the hash value for the pivot point in the current picture matches the hash value for a given candidate pivot point among the one or more candidate pivot points, comparing multiple sample values in an area around the pivot point in the current picture with corresponding sample values around the given candidate pivot point in the previous picture.

9. The computer system of claim 8, wherein the searching for the matching area further includes enlarging the area around the pivot point in the current picture until a stop condition occurs.

10. The computer system of claim 9, wherein the stop condition is failure to match between the sample values in the area around the pivot point in the current picture and the corresponding sample values around the given candidate pivot point in the previous picture.

11. The computer system of claim 8, wherein the pivot point in the current picture is a first pivot point, and wherein the searching for the matching area further includes:

checking whether the area around the first pivot point in the current picture overlaps a second pivot point in the current picture; and if so, discarding the first pivot point or the second pivot point.

12. The computer system of claim 1, wherein a data structure used in the motion estimation for the current picture includes one or more lists each having one or more candidate pivot points in the previous picture, and wherein the encoding further includes updating the data structure by performing one or more of:

retaining at least one of the one or more candidate pivot points in the previous picture;

removing at least one of the one or more candidate pivot points in the previous picture; and adding at least one pivot point in the current picture.

13. The computer system of claim 1, wherein the motion estimation for the current picture further includes identifying one or more changed regions in the current picture relative to the previous picture, and wherein the finding the pivot point in the current picture evaluates only sample values for the one or more changed regions in the current picture.

14. The computer system of claim 13, wherein a data structure used in the motion estimation for the current picture includes one or more lists each having one or more candidate pivot points in the previous picture, and wherein the encoding further includes updating the data structure by performing one or more of:

retaining any of the candidate pivot points in the previous picture that is outside the one or more changed regions;

removing any of the candidate pivot points in the previous picture that is inside the one or more changed regions; and adding at least one pivot point in the current picture, the at least one pivot point in the current picture being inside the one or more changed regions.

15. The computer system of claim 1, wherein the motion estimation for the current picture further includes aggregating local motion information for multiple smaller areas into global motion metadata for a larger area that includes the multiple smaller areas.

16. The computer system of claim 15, wherein the motion estimation for the current picture further includes using the global motion metadata to skip block-based motion estimation operations for multiple partitions of the current picture, and wherein the using the global motion metadata includes assigning motion vectors for the multiple partitions based on the global motion metadata.

17. The computer system of claim 15, wherein the encoding further includes:

setting syntax elements based on the global motion metadata; and signaling the syntax elements as part of the bitstream.

18. The computer system of claim 17, further comprising:

a video decoder configured to perform decoding of the multiple pictures, wherein the decoding includes:

parsing the syntax elements from the bitstream;

determining the global motion metadata from the syntax elements;

assigning motion vectors for multiple partitions of the current picture based on the global motion metadata; and performing motion compensation for the multiple partitions of the current picture.

19. A computer-implemented method comprising:

receiving multiple pictures in a video sequence;

encoding the multiple pictures to produce encoded data, wherein the encoding includes performing motion estimation for a current picture of the multiple pictures, the motion estimation for the current picture including:
finding a pivot point in the current picture;
calculating a hash value for the pivot point in the current picture; and
searching for a matching area in a previous picture based at least in part on the hash value for the pivot point in the current picture; and
outputting the encoded data as part of a bitstream.

20. The method of claim 19, wherein the motion estimation for the current picture further includes calculating multiple derivative sample values for the current picture based on base sample values for the current picture, the derivative sample values being used to find the pivot point in the current picture and to calculate the hash value for the pivot point in the current picture.

21. The method of claim 19, wherein the finding the pivot point in the current picture includes comparing sample values for the current picture to one or more patterns, each of the one or more patterns being indicative of an edge or character.

22. The method of claim 19, wherein the searching for the matching area includes:
calculating a hash index from the hash value for the pivot point in the current picture;
looking up the hash index in a data structure to find a list of one or more candidate pivot points in the previous picture; and
for each of at least one of the one or more candidate pivot points, comparing the hash value for the pivot point in the current picture to a hash value for the candidate pivot point.

23. The method of claim 22, wherein the list includes, for each of the one or more candidate pivot points, a location in the previous picture and the hash value for the candidate pivot point.

24. The method of claim 22, wherein the searching for the matching area further includes:
when the hash value for the pivot point in the current picture matches the hash value for a given candidate pivot point among the one or more candidate pivot points, comparing multiple sample values in an area around the pivot point in the current picture with corresponding sample values around the given candidate pivot point in the previous picture.

25. The method of claim 24, wherein the searching for the matching area further includes enlarging the area around the pivot point in the current picture until a stop condition occurs.

26. The method of claim 24, wherein the pivot point in the current picture is a first pivot point, and wherein the searching for the matching area further includes:
checking whether the area around the first pivot point in the current picture overlaps a second pivot point in the current picture; and
if so, discarding the first pivot point or the second pivot point.

27. The method of claim 19, wherein a data structure used in the motion estimation for the current picture includes one or more lists each having one or more candidate pivot points in the previous picture, and wherein the encoding further includes updating the data structure by performing one or more of:
retaining at least one of the one or more candidate pivot points in the previous picture;
removing at least one of the one or more candidate pivot points in the previous picture; and
adding at least one pivot point in the current picture.

28. The method of claim 19, wherein the motion estimation for the current picture further includes identifying one or more changed regions in the current picture relative to the previous picture, and wherein the finding the pivot point in the current picture evaluates only sample values for the one or more changed regions in the current picture.

29. The method of claim 19, wherein the motion estimation for the current picture further includes aggregating local motion information for multiple smaller areas into global motion metadata for a larger area that includes the multiple smaller areas.

30. One or more computer-readable media storing computer-executable instructions for causing a computer system, when programmed thereby, to perform operations comprising:
receiving multiple pictures in a sequence;
encoding the multiple pictures to produce encoded data, wherein the encoding includes performing motion estimation for a current picture of the multiple pictures, the motion estimation for the current picture including:
finding a pivot point in the current picture;
calculating a hash value for the pivot point in the current picture; and
searching for a matching area in a previous picture based at least in part on the hash value for the pivot point in the current picture; and
outputting the encoded data as part of a bitstream.

31. The one or more computer-readable media of claim 30, wherein the motion estimation for the current picture further includes calculating multiple derivative sample values for the current picture based on base sample values for the current picture, the derivative sample values being used to find the pivot point in the current picture and to calculate the hash value for the pivot point in the current picture.

32. The one or more computer-readable media of claim 30, wherein the finding the pivot point in the current picture includes comparing sample values for the current picture to one or more patterns, each of the one or more patterns being indicative of an edge or character.

33. The one or more computer-readable media of claim 30, wherein the searching for the matching area includes:
calculating a hash index from the hash value for the pivot point in the current picture;
looking up the hash index in a data structure to find a list of one or more candidate pivot points in the previous picture; and
for each of at least one of the one or more candidate pivot points, comparing the hash value for the pivot point in the current picture to a hash value for the candidate pivot point.

34. The one or more computer-readable media of claim 33, wherein the list includes, for each of the one or more candidate pivot points, a location in the previous picture and the hash value for the candidate pivot point.

35. The one or more computer-readable media of claim 33, wherein the searching for the matching area further includes:
when the hash value for the pivot point in the current picture matches the hash value for a given candidate pivot point among the one or more candidate pivot points, comparing multiple sample values in an area around the pivot point in the current picture with corresponding sample values around the given candidate pivot point in the previous picture.

36. The one or more computer-readable media of claim 35, wherein the searching for the matching area further includes enlarging the area around the pivot point in the current picture until a stop condition occurs.

37. The one or more computer-readable media of claim 35, wherein the pivot point in the current picture is a first pivot point, and wherein the searching for the matching area further includes:

checking whether the area around the first pivot point in the current picture overlaps a second pivot point in the current picture; and if so, discarding the first pivot point or the second pivot point.

38. The one or more computer-readable media of claim 30, wherein a data structure used in the motion estimation for the current picture includes one or more lists each having one or more candidate pivot points in the previous picture, and wherein the encoding further includes updating the data structure by performing one or more of:

retaining at least one of the one or more candidate pivot points in the previous picture;

removing at least one of the one or more candidate pivot points in the previous picture; and adding at least one pivot point in the current picture.

39. The one or more computer-readable media of claim 30, wherein the motion estimation for the current picture further includes identifying one or more changed regions in the current picture relative to the previous picture, and wherein the finding the pivot point in the current picture evaluates only sample values for the one or more changed regions in the current picture.

40. The one or more computer-readable media of claim 30, wherein the motion estimation for the current picture further includes aggregating local motion information for multiple smaller areas into global motion metadata for a larger area that includes the multiple smaller areas.

* * * * *